United States Patent
Itaya et al.

(10) Patent No.: US 10,436,468 B2
(45) Date of Patent: Oct. 8, 2019

(54) MONITORING DEVICE, MONITORING SYSTEM, MONITORING METHOD, AND NON-TRANSITORY STORAGE MEDIUM

(71) Applicant: NEC Corporation, Tokyo (JP)

(72) Inventors: Satoko Itaya, Tokyo (JP); Yuan Luo, Tokyo (JP); Shin Nakamura, Tokyo (JP); Kenichi Maruhashi, Tokyo (JP)

(73) Assignee: NEC Corporation, Tokyo (JP)

( * ) Notice: Subject to any disclaimer, the term of this patent is extended or adjusted under 35 U.S.C. 154(b) by 144 days.

(21) Appl. No.: 15/128,464

(22) PCT Filed: Nov. 20, 2014

(86) PCT No.: PCT/JP2014/080785
§ 371 (c)(1),
(2) Date: Sep. 23, 2016

(87) PCT Pub. No.: WO2015/145865
PCT Pub. Date: Oct. 1, 2015

(65) Prior Publication Data
US 2017/0307245 A1    Oct. 26, 2017

(30) Foreign Application Priority Data
Mar. 24, 2014 (JP) .................. 2014-059753

(51) Int. Cl.
*F24F 11/00* (2018.01)
*A47J 27/21* (2006.01)
(Continued)

(52) U.S. Cl.
CPC ......... *F24F 11/30* (2018.01); *A47J 27/21091* (2013.01); *F24F 11/64* (2018.01);
(Continued)

(58) Field of Classification Search
CPC ........ F24F 11/30; F24F 11/0086; F24F 11/52; F24F 2011/0091; A47J 27/21091; G01M 99/008
See application file for complete search history.

(56) References Cited

U.S. PATENT DOCUMENTS 4,851,985 A * 7/1989 Burror ................. G05B 19/058
                                                          700/79
2006/0064278 A1* 3/2006 Pohl .................... H04L 43/0864
                                                          702/176
(Continued)

FOREIGN PATENT DOCUMENTS

JP       5-11835      1/1993
JP       2001-218367  8/2001
(Continued)

OTHER PUBLICATIONS

International Search Report and Written Opinion dated Feb. 17, 2015, in corresponding PCT International Application.
(Continued)

*Primary Examiner* — Manuel L Barbee
(74) *Attorney, Agent, or Firm* — Finnegan, Henderson, Farabow, Garrett & Dunner, L.L.P.

(57) ABSTRACT

In the present invention, provided is a monitoring device (10) including an operating-state-change information acquisition unit (11) that acquires operating-state-change information indicating a time-series change in operating states of an electrical device, the device being capable of assuming multiple types of operating states, a standard transition pattern storage unit (12) that stores standard transition pattern information indicating a pattern of transition between operating states generated in a normal electrical device, and a monitoring unit (13) that determines whether or not the electrical device is normal using the operating-
(Continued)

state-change information and the standard transition pattern information.

8 Claims, 23 Drawing Sheets

(51) Int. Cl.
      *G01M 99/00*     (2011.01)
      *F24F 11/30*     (2018.01)
      *H04Q 9/00*      (2006.01)
      *G05B 23/02*     (2006.01)
      *F24F 11/64*     (2018.01)
      *F24F 11/32*     (2018.01)
      *F24F 11/52*     (2018.01)

(52) U.S. Cl.
    CPC ....... *G01M 99/008* (2013.01); *G05B 23/0232* (2013.01); *H04Q 9/00* (2013.01); *F24F 11/32* (2018.01); *F24F 11/52* (2018.01); *F24F 2221/22* (2013.01); *H04Q 2209/823* (2013.01)

(56) References Cited

U.S. PATENT DOCUMENTS

| | | | | |
|---|---|---|---|---|
| 2010/0324962 | A1* | 12/2010 | Nesler | .................. G01R 21/133 |
| | | | | 705/7.36 |
| 2011/0016363 | A1* | 1/2011 | Washio | .................. H04M 3/36 |
| | | | | 714/57 |

FOREIGN PATENT DOCUMENTS

| | | |
|---|---|---|
| JP | 2004-127071 | 4/2004 |
| JP | 2004-192492 | 7/2004 |
| JP | 2006-106870 | 4/2006 |
| JP | 2006-155200 | 6/2006 |

OTHER PUBLICATIONS

Notification of Reasons for Refusal dated Dec. 18, 2018, by Japanese Patent Office in counterpart Japanese Patent Application 2016-509901.

* cited by examiner

FIG. 6

| PRE-TRANSITION OPERATING STATE | POST-TRANSITION OPERATING STATE |
|---|---|
| STANDBY STATE | HEATING STATE |
| HEATING STATE | TEMPERATURE MAINTAINING STATE |
| TEMPERATURE MAINTAINING STATE | HEATING STATE |
| TEMPERATURE MAINTAINING STATE | STANDBY STATE |

FIG. 7

| OPERATING STATE | STANDARD DURATION TIME |
|---|---|
| STANDBY STATE | WITHIN 1440 MINUTES |
| HEATING STATE | WITHIN 5 MINUTES |
| TEMPERATURE MAINTAINING STATE | WITHIN 1440 MINUTES |

FIG. 8

| ELECTRICAL DEVICE | NON-STANDARD TRANSITION THRESHOLD |
|---|---|
| ELECTRICAL POT | 5 TIMES/DAY |
| AIR CONDITIONER | 3 TIMES/DAY |
| ⋮ | ⋮ |

FIG. 14

| MAINTENANCE | COMBINATION | |
|---|---|---|
| AIR CONDITIONER (OFFICE) CLEANING | AIR CONDITIONER (OFFICE) - OFF STATE | ILLUMINATION (OFFICE) - ON STATE |
| AIR CONDITIONER (CUSTOMER AREA 1) CLEANING | AIR CONDITIONER (CUSTOMER AREA 1) - OFF STATE | AIR CONDITIONER (CUSTOMER AREA 2) - COOLING (HIGH) STATE |
| AIR CONDITIONER (CUSTOMER AREA 1) CLEANING | AIR CONDITIONER (CUSTOMER AREA 1) - OFF STATE | AIR CONDITIONER (CUSTOMER AREA 2) - HEATING (HIGH) STATE |
| ⋮ | ⋮ | ⋮ |

FIG. 15

| MAINTENANCE | COMBINATION | | | DURATION TIME |
|---|---|---|---|---|
| AIR CONDITIONER (OFFICE) CLEANING | AIR CONDITIONER (OFFICE) - OFF STATE | ILLUMINATION (OFFICE) - ON STATE | | MORE THAN 20 MINUTES |
| AIR CONDITIONER (CUSTOMER AREA 1) CLEANING | AIR CONDITIONER (CUSTOMER AREA 1) - OFF STATE | AIR CONDITIONER (CUSTOMER AREA 2) - COOLING (HIGH) STATE | | MORE THAN 15 MINUTES |
| ⋮ | ⋮ | ⋮ | | |

FIG. 16

| TIME | : | 01:30 | | 01:35 | | 01:40 | | 01:45 | |
|---|---|---|---|---|---|---|---|---|---|
| AIR CONDITIONER (OFFICE) | : | [ COOLING (MEDIUM) STATE ] | — | [ COOLING (MEDIUM) STATE ] | — | [ COOLING (MEDIUM) STATE ] | — | [ OFF STATE ] | ... |
| ILLUMINATION (OFFICE) | : | [ OFF STATE ] | — | [ OFF STATE ] | — | [ ON STATE ] | — | [ ON STATE ] | ... |

FIG. 20

| ELECTRICAL DEVICE | OPERATING STATE | FEATURE AMOUNT |
|---|---|---|
| POT | STANDBY STATE | ○○○ |
| POT | HEATING STATE | △△△ |
| POT | TEMPERATURE MAINTAINING STATE | ××× |
| AIR CONDITIONER (OFFICE) | STANDBY STATE | ○○○○ |
| AIR CONDITIONER (OFFICE) | COOLING (HIGH) STATE | ××○× |
| ⋮ | ⋮ | ⋮ |

FIG. 23

| PRE-TRANSITION OPERATING STATE | POST-TRANSITION OPERATING STATE | THRESHOLD |
|---|---|---|
| STANDBY STATE | HEATING STATE | 5 TIMES/h |
| HEATING STATE | TEMPERATURE MAINTAINING STATE | 10 TIMES/h |
| TEMPERATURE MAINTAINING STATE | HEATING STATE | 10 TIMES/h |
| TEMPERATURE MAINTAINING STATE | STANDBY STATE | 5 TIMES/h |

MONITORING DEVICE, MONITORING SYSTEM, MONITORING METHOD, AND NON-TRANSITORY STORAGE MEDIUM

CROSS-REFERENCE TO RELATED PATENT APPLICATIONS

This application is a National Stage Entry of International Application No. PCT/JP2014/080785, filed Nov. 20, 2014, which claims priority from Japanese Patent Application No. 2014-059753, filed Mar. 24, 2014. The entire contents of the above-referenced applications are expressly incorporated herein by reference.

TECHNICAL FIELD

The present invention relates to a monitoring device, a monitoring system, a monitoring method, and a program.

BACKGROUND ART

Patent Document 1 discloses a process management device that determines the presence or absence of abnormality by performing wavelet analysis on a plurality of pieces of process result data (such as, for example, energy consumption, outside air temperature, room temperature, and indoor humidity of air-conditioning equipment) obtained by measuring a process in a time-series manner, and transforming the analysis results into a three-dimensional contour pattern.

Patent Document 2 discloses an energy device system used in a store including a plurality of electrical devices that receives a supply of power from a power system to perform air-conditioning, refrigeration, illumination and the like within a store, a plurality of sensors that detects the state quantity according to each of the electrical devices, a management and control unit that, on receiving a detection signal from each sensor, inputs a control signal to each of the electrical devices for performing management and control while correlating the state quantities between each of the electrical devices in a constant manner based on an electrical device operating algorithm, and an operating algorithm update unit that updates the electrical device operating algorithm of the management and control unit.

RELATED DOCUMENTS

Patent Documents

[Patent Document 1] Japanese Unexamined Patent Application Publication No. 2006-106870
[Patent Document 2] Japanese Unexamined Patent Application Publication No. 2001-218367

SUMMARY OF THE INVENTION

Methods of reducing the amount of power consumption may include (1) suppressing unnecessary power consumption due to an electrical device in a defective state by detecting the defect (such as a failure or an undesirable usage) of the electrical device during its operation at an early stage and appropriately coping with the defect, and (2) suppressing an unnecessary increase in the amount of power consumption of an electrical device by performing maintenance of an electrical device (for example, cleaning the filter of an air conditioner), and the like. In order to reduce the amount of power consumption using these methods, a technique for detecting a defect or unperformed maintenance of an electrical device is being demanded.

The technique disclosed in Patent Document 1 allows detection of an abnormality in a process; however, there is a problem in that the technique is unable to detect a failure, a defect, and an abnormal state of which the details are not specified in advance. Patent Document 2 does not disclose a technique for detecting a defect and unperformed maintenance of an electrical device.

An object of the present invention is to achieve a technique for detecting a defect or unperformed maintenance of an electrical device using an unprecedented method.

According to the present invention, there is provided a monitoring device including: an operating-state-change information acquisition unit that acquires operating-state-change information indicating a time-series change in operating states of an electrical device, the device being capable of assuming multiple types of operating states; and a monitoring unit that acquires standard transition pattern information indicating a transition pattern between the operating states serving as a standard, and determines whether or not a transition between the operating states of the electrical device is within the standard, using the operating-state-change information and the standard transition pattern information.

In addition, according to the present invention, there is provided a monitoring device including: an operating-state-change information acquisition unit that acquires operating-state-change information indicating a time-series change in operating states of each of a plurality of electrical devices, the devices being capable of assuming multiple types of operating states; and an operation monitoring unit that acquires standard combination pattern information indicating a combination of the operating states of the plurality of electrical devices, the combination of the operating states corresponding to a predetermined operation, and determines, using the operating-state-change information and the standard combination pattern information, whether or not the predetermined operation is executed.

In addition, according to the present invention, there is provided a monitoring system including: the monitoring device described above; and a data collection device including a data collection unit that acquires measurement data including at least one of a consumption current, an input voltage and power consumption of the electrical device, in which the monitoring device or the data collection device further includes an operating-state-change information generation unit that acquires the measurement data from the data collection unit, and generates the operating-state-change information using the measurement data, and the operating-state-change information acquisition unit of the monitoring device acquires the operating-state-change information generated by the operating-state-change information generation unit.

In addition, according to the present invention, there is provided a program causing a computer to function as: an operating-state-change information acquisition unit that acquires operating-state-change information indicating a time-series change in operating states of an electrical device, the device being capable of assuming multiple types of operating states; and a monitoring unit that acquires standard transition pattern information indicating a transition pattern between the operating states serving as a standard, and determines whether or not a transition between the operating states of the electrical device is within the standard, using the operating-state-change information and the standard transition pattern information.

In addition, according to the present invention, there is provided a program causing a computer to function as: an operating-state-change information acquisition unit that acquires operating-state-change information indicating a time-series change in operating states of each of a plurality of electrical devices, the devices being capable of assuming multiple types of operating states; and an operation monitoring unit that acquires standard combination pattern information indicating a combination of the operating states of the plurality of electrical devices, the combination of the operating states corresponding to a predetermined operation, and determines, using the operating-state-change information and the standard combination pattern information, whether or not the predetermined operation is executed.

In addition, according to the present invention, there is provided a monitoring method executed by a computer, the method including: an operating-state-change information acquisition step of acquiring operating-state-change information indicating a time-series change in operating states of an electrical device, the device being capable of assuming multiple types of operating states; and a monitoring step of acquiring standard transition pattern information indicating a transition pattern between the operating states serving as a standard, and determining whether or not a transition between the operating states of the electrical device is within the standard, using the operating-state-change information and the standard transition pattern information.

In addition, according to the present invention, there is provided a monitoring method executed by a computer, the method including: an operating-state-change information acquisition step of acquiring operating-state-change information indicating a time-series change in operating states of each of a plurality of electrical devices, the devices being capable of assuming multiple types of operating states; and an operation monitoring step of acquiring standard combination pattern information indicating a combination of the operating states of the plurality of electrical devices, the combination of the operating states corresponding to a predetermined operation, and determining, using the operating-state-change information and the standard combination pattern information, whether or not the predetermined operation is executed.

According to the present invention, a technique for detecting a defect or unperformed maintenance of an electrical device is achieved using an unprecedented method.

BRIEF DESCRIPTION OF THE DRAWINGS

The above and other objects, features and advantages will be made clearer from certain preferred exemplary embodiments described below, and the following accompanying drawings.

FIG. 6 is a diagram schematically illustrating an example of standard transition pattern information of the present exemplary embodiment.

FIG. 7 is a diagram schematically illustrating an example of allowable duration time information of the present exemplary embodiment.

FIG. 8 is a diagram schematically illustrating an example of information indicating a threshold of the frequency of occurrence of the present exemplary embodiment.

FIG. 14 is a diagram schematically illustrating an example of standard combination pattern information of the present exemplary embodiment.

FIG. 15 is a diagram schematically illustrating an example of the standard combination pattern information of the present exemplary embodiment.

FIG. 16 is a diagram schematically illustrating an example of the operating-state-change information of the present exemplary embodiment.

FIG. 20 is a diagram schematically illustrating an example of information indicating a feature amount of each electrical device in each operating state which is stored by the monitoring device or the data collection device of the present exemplary embodiment.

FIG. 23 is a diagram schematically illustrating an example of the standard transition pattern information of the present exemplary embodiment.

DESCRIPTION OF EXEMPLARY EMBODIMENTS

First, an example of the hardware configuration of a device of the present exemplary embodiment will be described.

Each unit included in the device of the present exemplary embodiment is embodied by any combination of hardware and software based on a central processing unit (CPU) of any computer, a memory, a program (also including program downloaded from a recording medium such as a compact disc (CD), a server on the Internet, or the like, in addition to a program stored within a memory from a step of shipping a device in advance) loaded into the memory, a storage unit such as a hard disk having the program stored thereon, and an interface for network connection. It will be understood by those skilled in the art that embodying methods and devices thereof may be modified in various ways.

Figure 1:
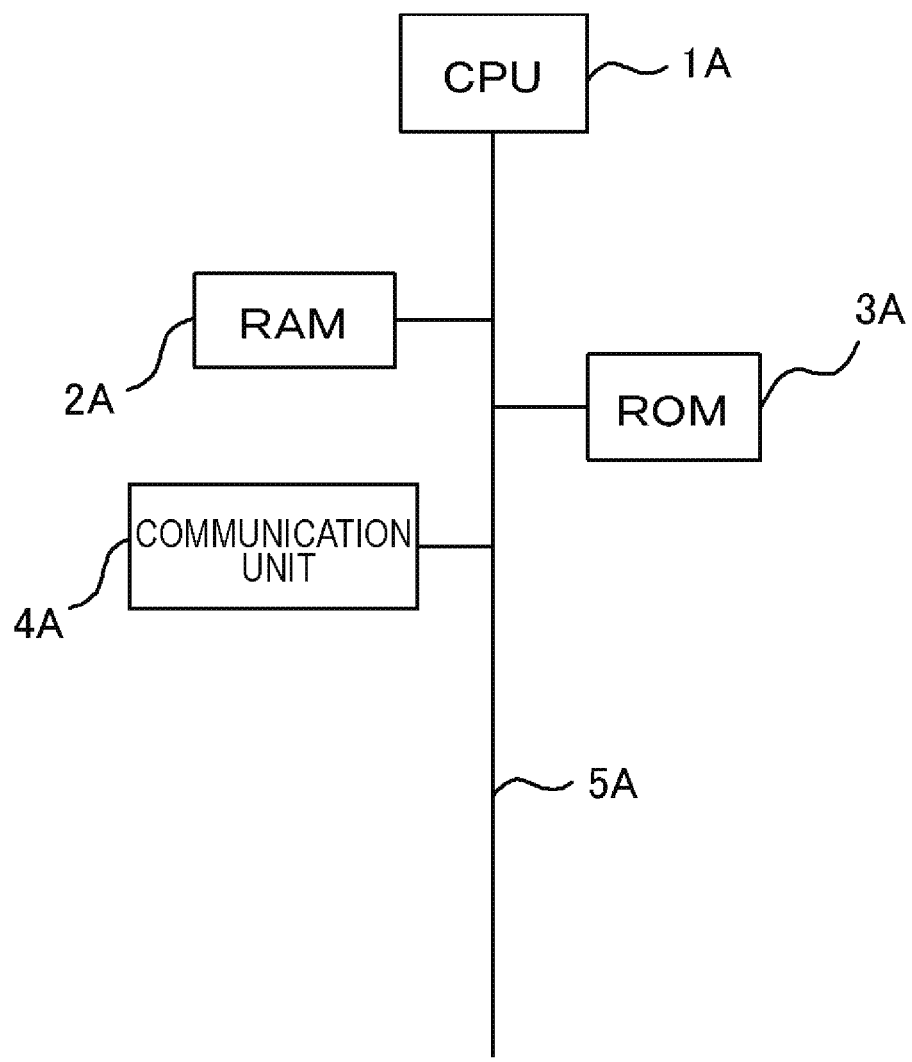
FIG. 1 is a diagram conceptually illustrating an example of a hardware configuration of a device of the present exemplary embodiment.

FIG. 1 is a diagram conceptually illustrating an example of the hardware configuration of the device of the present exemplary embodiment. As shown in the drawing, the device of the present exemplary embodiment includes, for example, a CPU 1A, random access memory (RAM) 2A, a read only memory (ROM) 3A, a communication unit 4A, and the like which are connected to each other through a bus 5A. Meanwhile, although not shown in the drawing, the device of the present exemplary embodiment may include other elements such as an operation receiving unit, an operating unit, a display control unit, a display unit, an auxiliary storage device, an input and output I/F connected to an external device in a wired manner, a microphone, a speaker, and a camera.

The CPU 1A controls the entire computer together with each element. The ROM 3A includes an area for storing programs for bringing the computer into operation, various application programs, various setting data used when these programs operate, and the like. The RAM 2A includes an area, such as a work area in order for programs to operate, in which data is temporarily stored. The auxiliary storage device is, for example, a hard disk drive (HDD), and has a large storage capacity.

The communication unit 4A is configured capable of communicating with other devices by connecting to a network such as a local area network (LAN) or the Internet through wired and/or wireless communication. Meanwhile, the communication unit 4A may be configured to be capable of wirelessly communicating with other devices based on a predetermined wireless communication standard (for example, Bluetooth (Registered Trademark) or Wifi (Registered Trademark)).

The operation receiving unit receives an operation through the operating unit. The operating unit includes an operation key, an operation button, a switch, a jog dial, a keyboard, a mouse, a touch panel display, and the like.

The display unit includes an indicator (light emitting diode (LED)) of a display device, a liquid crystal display, or an organic electro luminescence (EL) display). The display device may be a touch panel display integrated with a touch pad. The display control unit performs various screen displays by reading out data stored in a video RAM (VRAM), performing a predetermined process on the read-out data, and then sending the data to the display unit.

Hereinafter, the exemplary embodiments will be described. Meanwhile, each functional block diagrams which is used in the description of the following exemplary embodiments represents a function-based block rather than a hardware-based configuration. In the following drawings, each of a controller and a server are described so as to be embodied by one device, but its embodying unit is not limited thereto. That is, the controller and the server may be physically divided into each other, and may be logically divided into each other.

First Exemplary Embodiment

First, the outline of the present exemplary embodiment will be described. The inventors have examined electrical devices capable of assuming multiple types of operating states and have found that, "when there is no occurrence of a defect (such as a failure), a certain electrical device transitions between operating states in a predetermined pattern (standard pattern)", and "when there is an occurrence of a defect (such as a failure), such an electrical device may exhibit a pattern of transition different from the standard pattern". An example of such an electrical device may include an electric pot that heats a filled content such as water contained therein up to a predetermined temperature and maintains the content at a predetermined temperature.

The electric pot without the occurrence of a defect transitions from a standby state, which is a heating-start-instruction waiting state, to a heating state in which a filled content is heated, and then transitions to a temperature maintaining state in which the filled content is maintained at a predetermined temperature.

On the other hand, in an electric pot with an occurrence of a defect, the pattern of this transition is deteriorated, and for example, transition from the standby state to the temperature maintaining state may occur. In addition, there may be a case where, after transition from the standby state to the heating state, without transition from the heating state to the temperature maintaining state, there may be an occurrence of the heating state being continued even after the filled content is heated up to a predetermined temperature.

The monitoring device of the present exemplary embodiment is devised in view of such circumstances, and is configured to determine whether a defect has occurred in an electrical device by monitoring the transition between the operating states of the electrical device.

Figure 2:
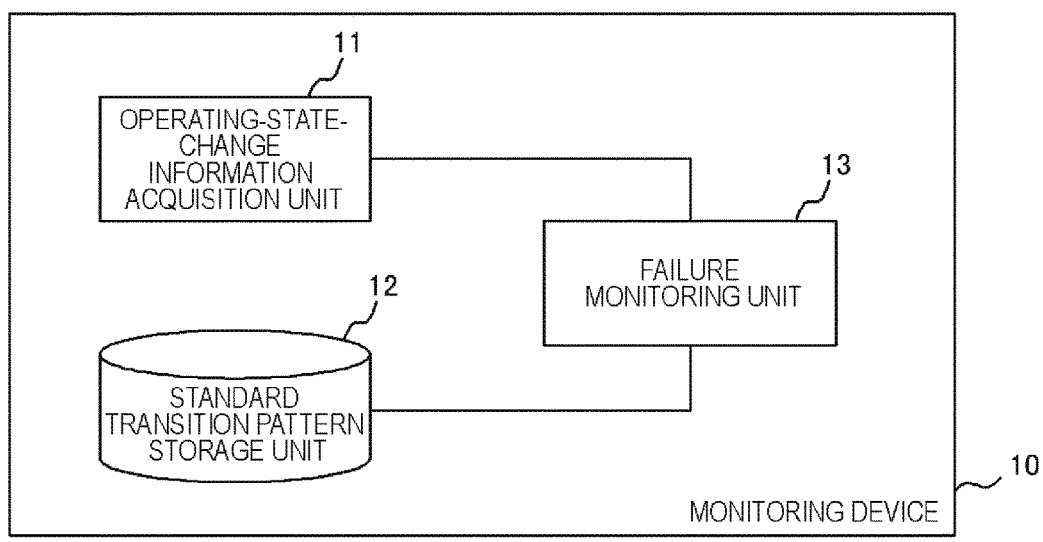
FIG. 2 is an example of a functional block diagram of a monitoring device of the present exemplary embodiment.

Hereinafter, the configuration of the monitoring device of the present exemplary embodiment will be described in detail. FIG. 2 shows an example of a functional block diagram of a monitoring device 10 of the present exemplary embodiment. As shown in the drawing, the monitoring device 10 of the present exemplary embodiment includes an operating-state-change information acquisition unit 11, a standard transition pattern storage unit 12, and a monitoring unit 13. Meanwhile, the monitoring device 10 may not include the standard transition pattern storage unit 12 (see FIG. 22).

The operating-state-change information acquisition unit 11 acquires operating-state-change information indicating a time-series change in the operating state of the electrical device capable of assuming multiple types of operating states. The operating-state-change information is information indicating a time-series change in an operating state actually observed in an electrical device to be monitored. The operating-state-change information which is acquired by the operating-state-change information acquisition unit 11 is associated with each electrical device.

The operating state is a state that may be assumed by each electrical device and may be arbitrarily defined for each electrical device or for each type of electrical device. The electrical device performs different operations in a first operating state and in a second operating state. For example, in a case where the electrical device is an electric pot, three operating states of a standby state, a heating state, and a temperature maintaining state can be defined as described above. Besides, in a case where the electrical device is an air conditioner, it is possible to define a plurality of operating states such as a standby state which is an operation start instruction waiting state, a cooling state, a heating state, a dehumidifying state, and an adjusting state in which the cooling, heating, dehumidification and the like are stopped (or lowered) since the temperature is near a set temperature. Meanwhile, in a case where the electrical device is an air conditioner, an example can also be considered in which the cooling state is further divided into three operating states of a cooling state (high), a cooling state (medium), and a cooling state (low) in accordance with the strength thereof (the same is true of the heating state and the dehumidifying state).

Figure 3:
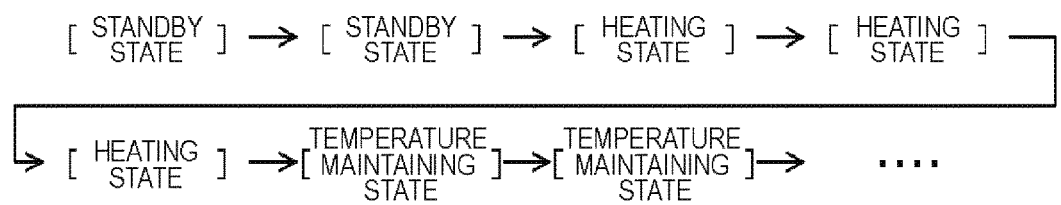
FIG. 3 is a diagram schematically illustrating an example of operating-state-change information of the present exemplary embodiment.
Figure 4:
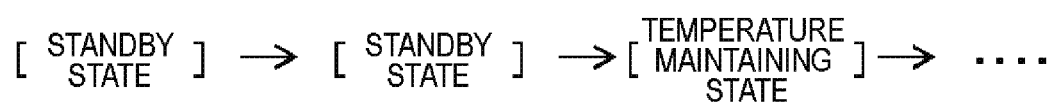
FIG. 4 is a diagram schematically illustrating an example of the operating-state-change information of the present exemplary embodiment.
Figure 5:
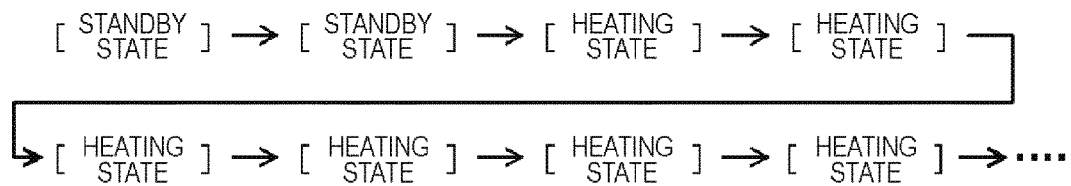
FIG. 5 is a diagram schematically illustrating an example of the operating-state-change information of the present exemplary embodiment.

Here, FIGS. 3 to 5 schematically show an example of the operating-state-change information. The operating-state-change information shown in these drawings indicate a time-series change in the operating state of an electric pot. These drawings show a time-series change in the operating states of an electrical device specified for each predetermined unit time. An operating state in one unit time is shown in brackets, and the operating states written in the brackets are linked to each other by an arrow, indicating the time-series order of the operating states. The predetermined unit time can be determined in accordance with a general duration time or the like of each operating state, for each electrical device or for each type of electrical device. For example, the predetermined unit time can be set to five seconds, thirty seconds, one minute, three minutes, five minutes, ten minutes, thirty minutes, or the like.

In a case of the example shown in FIG. 3, it can be understood that, after the standby state first continues for the "predetermined unit time"×2, the heating state continues for the "predetermined unit time"×3, and then the temperature maintaining state continues for the "predetermined unit time"×2.

In a case of the example shown in FIG. 4, it can be understood that, after the standby state first continues for the "predetermined unit time"×2, and the temperature maintaining state continues for the "predetermined unit time".

In an example shown in FIG. 5, it can be understood that, after the standby state first continues for the "predetermined unit time"×2, and the heating state continues for the "predetermined unit time"×5.

Meanwhile, although not shown in FIGS. 3 to 5, the operating-state-change information may be associated with time information. That is, a time at which each operating state occurs may be shown in the operating-state-change information.

The operating-state-change information acquisition unit 11 can acquire such operating-state-change information through various methods. For example, a device different from the monitoring device 10 or a user may input the operating-state-change information in the monitoring device 10. The operating-state-change information acquisition unit 11 may acquire the operating-state-change information which is input in this manner. Alternatively, the monitoring device 10 may generate the operating-state-change information. The operating-state-change information acquisition unit 11 may acquire the operating-state-change information generated within the own device (monitoring device 10). The operating-state-change information can be generated, for example, using time-series measurement data (such as waveform data) including at least one of the consumption current, input voltage and power consumption of each electrical device, and a feature amount (training data) shown by each electrical device during each operating state. An example of the generation method will be described in the following exemplary embodiment.

The operating-state-change information acquisition unit 11 may acquire the operating-state-change information through real-time processing or may acquire the information through batch processing (for example, once a day, once in six-hours, or once an hour).

Referring back to FIG. 2, the standard transition pattern storage unit 12 stores standard transition pattern information indicating a pattern of transition between operating states generated in an electrical device (unfailed electrical device) without the occurrence of a defect. For example, the standard transition pattern storage unit 12 stores, as the standard transition pattern information, information obtained by associating a first operating state with a standard post-transition operating state which is at least one operating state that may be assumed by the electrical device without a defect immediately after the first operating state.

Here, FIG. 6 shows an example of the standard transition pattern information. In the shown standard transition pattern information, the pre-transition operating state (first operating state) in transition between operating states generated in the electrical device without the occurrence of a defect and the post-transition operating state (standard post-transition operating state) are associated with each other. The standard transition pattern information is information relating to an electric pot.

According to the standard transition pattern information shown in FIG. 6, it can be understood that an electric pot without the occurrence of a defect transitions to the heating state after the standby state. In addition, according to the standard transition pattern information, it can be understood that the electric pot without the occurrence of a defect transitions to the temperature maintaining state after the heating state. In addition, according to the standard transition pattern information, it can be understood that the electric pot without the occurrence of a defect transitions to the heating state or the standby state after the temperature maintaining state.

Meanwhile, the data format of the standard transition pattern information is not limited to those shown in FIG. 6, and various formats can be adopted.

Referring back to FIG. 2, the monitoring unit 13 determines whether the transition between the operating states of an electrical device is within the standard using the operating-state-change information and the standard transition pattern information. For example, the monitoring unit 13 can acquire the operating-state-change information from the operating-state-change information acquisition unit 11 included in the monitoring device 10 and acquire the standard transition pattern information from the standard transition pattern storage unit 12. Meanwhile, in a case where the monitoring device 10 does not include the standard transition pattern storage unit 12, a device different from the monitoring device 10 may include the standard transition pattern storage unit 12. The monitoring unit 13 may communicate with the different device, and acquire the standard transition pattern information from the standard transition pattern storage unit 12 included in the different device. Further, the monitoring unit 13 may appropriately generate the standard transition pattern information.

The monitoring unit 13 extracts, for example, a non-standard transition from a time-series change in the operating states indicated by the operating-state-change information (see FIGS. 3 to 5), the non-standard transition being a transition that is not a transition between the operating states indicated by the standard transition pattern information (see FIG. 6).

The non-standard transition may include transition between operating states which is not indicated by the standard transition pattern information. For example, in a case of the standard transition pattern information shown in FIG. 6, the operating state transition from the standby state is only to the heating state. In this example, the operating state transition from the standby state to the temperature maintaining state is a non-standard transition. That is, the monitoring unit 13 extracts a transition between operating states which is not indicated by such standard transition pattern information, as a non-standard transition, from a time-series change in the operating states indicated by the operating-state-change information (see FIGS. 3 to 5).

As another non-standard transition, there is a case in which a transition between operating states indicated by the standard transition pattern information does not occur. For example, in a case of the standard transition pattern information shown in FIG. 6, the operating state is shown to transition from the heating state to the temperature maintaining state. That is, it is shown that the operating state of an electrical device without a defect transitions from the heating state to the temperature maintaining state. In this example, a non-standard transition would be a case where, after a heating state is generated, the heating state continues, and a transition to the temperature maintaining state does not occur.

In a case of this example, the monitoring unit 13 may hold information indicating an allowable duration time (allowable duration time information) of each operating state for each electrical device. FIG. 7 shows an example of the allowable duration time information. In the allowable duration time information shown in FIG. 7, the allowable duration time (standard duration time) of each operating state is shown in association with each operating state. The monitoring unit 13 extracts, as the non-standard transition, a state where an operating state exceeding the allowable duration time (standard duration time) continues (state where a transition that should occur thereafter does not occur), from a time-series change in the operating states indicated by the operating-state-change information (see FIGS. 3 to 5).

Here, a description will be given of the concept of a process in which the non-standard transition is extracted by the monitoring unit 13, using the operating-state-change information shown in FIGS. 3 to 5, the standard transition pattern information shown in FIG. 6, and the allowable duration time information shown in FIG. 7. Herein, the unit time of the operating-state-change information shown in FIGS. 3 to 5 is assumed to be one minute. That is, it is shown that each operating state shown within brackets continues for one minute.

In a case of the example shown in FIG. 3, the only transitions between the generated operation states are the two patterns of "standby state→heating state" and "heating state→temperature maintaining state". Meanwhile, a case where the same operating state continues as in "standby state→standby state" does not correspond to a transition between the operating states. Both the two transition patterns of the example shown in FIG. 3 are included in the standard transition pattern information of FIG. 6. In addition, the duration time of the standby state is two minutes, the duration time of the heating state is three minutes, and the duration time of the temperature maintaining state is two minutes, all the duration times being within a range of the allowable duration time indicated by the allowable duration time information of FIG. 7. Therefore, in a case of the example shown in FIG. 3, no non-standard transition is extracted by the monitoring unit 13.

In an example shown in FIG. 4, the only transition between operating states that is generated is a pattern of "standby state→temperature maintaining state". This pattern is not included in the standard transition pattern information of FIG. 6. That is, the pattern corresponds to a non-standard transition. Meanwhile, the duration time of the standby state is two minutes, and the duration time of the temperature maintaining state is one minute, both the duration times being within a range of the allowable duration time indicated by the allowable duration time information of FIG. 7. Therefore, in an example shown in FIG. 4, the monitoring unit 13 extracts the transition pattern of "standby state→temperature maintaining state" as a non-standard transition.

In a case of the example shown in FIG. 5, the only transition between operating states that is generated is a pattern of "standby state→heating state". This pattern is included in the standard transition pattern information of FIG. 6. The duration time of the standby state is two minutes, and the duration time of the heating state is six minutes. The duration time of the standby state is within a range of the allowable duration time indicated by the allowable duration time information of FIG. 7, but the duration time of the heating state exceeds a range of the allowable duration time indicated by the allowable duration time information of FIG. 7. That is, the pattern corresponds to a non-standard transition. Therefore, in a case of the example shown in FIG. 5, the monitoring unit 13 extracts the state where the transition of "heating state→temperature maintaining state" is not generated after the heating state (a state where a transition that should be generated is not generated) as a non-standard transition.

In this manner, the monitoring unit 13 can extract a non-standard transition from a time-series change in the operating states. The monitoring unit 13 can determine whether there is an occurrence of a defect in an electrical device based on the extraction result of the non-standard transition (whether a transition between the operating states of an electrical device is within the standard).

For example, the monitoring unit 13 may determine an electrical device having the non-standard transition extracted therefrom one or more times as a defective device. Alternatively, the monitoring unit 13 may determine whether there is an occurrence of a defect in an electrical device based on the frequency of occurrence of non-standard transitions. For example, the monitoring unit 13 may hold a threshold of the frequency of occurrence of the non-standard transitions for each electrical device (see FIG. 8). The monitoring unit 13 may then calculate the frequency of occurrence of the non-standard transitions for each electrical device and thereafter determine whether the calculated frequency of occurrence exceeds the threshold. The monitoring unit may determine that a defect has occurred in the electrical device in a case where the frequency of occurrence exceeds the threshold.

The monitoring device 10 can output the determination result of the monitoring unit 13 to a user. An output method may include displaying the result on a display included in the monitoring device 10 or on a display connected to the monitoring device 10, transmitting the result to an address (such as an e-mail address) previously registered in the monitoring device 10, outputting the result through a printer, or the like. The determination results to be output may include attached information such as the contents, the frequency of occurrence, and the time of occurrence of the extracted non-standard transition, in addition to information for specifying an electrical device determined as being defective.

An example of the determination result to be output may include an example of "There may be a defect in the electric pot. One non-standard transition from standby state to temperature maintaining state has been found. The non-standard transition has been detected four times on Feb. 4, 2014." Other outputted examples may include an example of "There may be a defect in the electric pot. A non-standard transition from standby state to temperature maintaining state (first non-standard transition) and a non-standard transition of maintained heating state without transition to the temperature maintaining state (second non-standard transition) have been found. The first non-standard transition has been detected two times, and the second non-standard transition has been detected five times on Feb. 4, 2014." Meanwhile, in a case where a defect has not been detected, the determination result of "The electric pot is normal. No non-standard transition have been found on Feb. 4, 2014." may be output.

Figure 9:
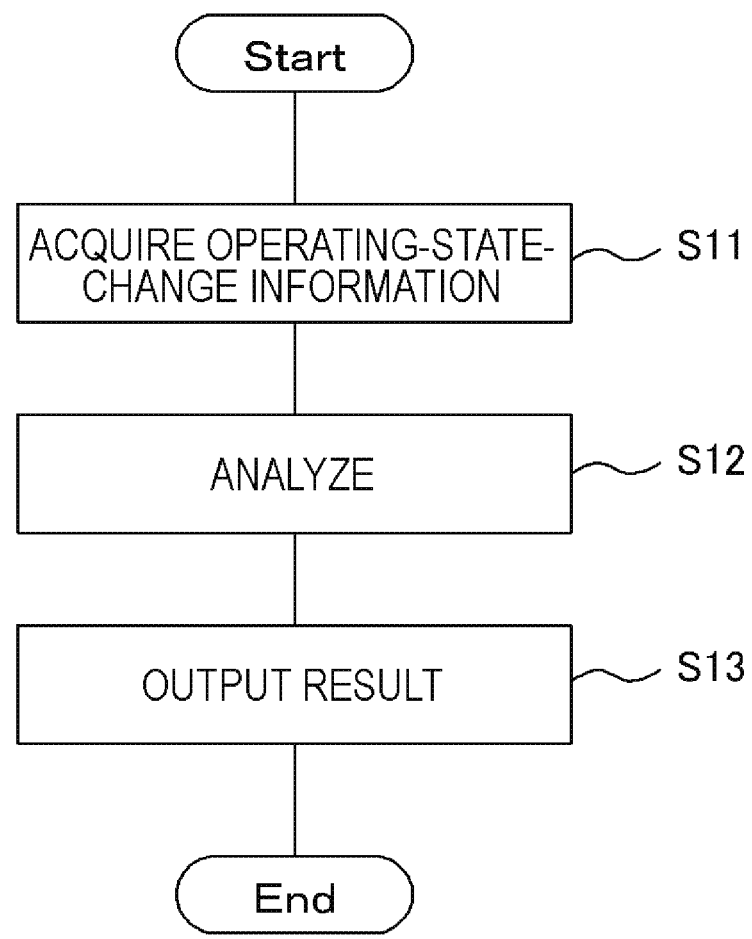
FIG. 9 is a flow diagram illustrating an example of a flow of processes of the monitoring device of the present exemplary embodiment.

Next, an example of a flow of processes of the monitoring device 10 of the present exemplary embodiment will be described with standard to a flow diagram of FIG. 9. Here, both an example of a flow in which batch processing is performed by the monitoring device 10 and an example of a flow in which real-time processing is performed will be described.

To begin with, an example of batch processing will be described. First, the operating-state-change information acquisition unit 11 acquires the operating-state-change information indicating a time-series change in the operating state of an electrical device capable of assuming multiple types of operating states, through the batch processing (S11).

For example, the operating-state-change information acquisition unit 11 acquires one day's worth (for example, from 0 o'clock to 24 o'clock) of operating-state-change information (for example, FIGS. 3 to 5) of an electric pot, at a predetermined timing (for example, a preset time on the next day or at a timing when there is an input of an acquisition instruction from a user).

A predetermined period's worth of operating-state-change information may be generated by, for example, the monitoring device 10 and stored in a storage device within the monitoring device 10. The operating-state-change information acquisition unit 11 may acquire the predetermined period's worth of operating-state-change information from the storage device at the above predetermined timing. Alternatively, the predetermined period's worth of operating-state-change information may be generated by, for example, a device different from the monitoring device 10 and stored in a storage device within an external device different from the monitoring device 10. The operating-state-change information acquisition unit 11 may access the external device at the above predetermined timing and acquire the predetermined period's worth of operating-state-change information. These examples are suited for a case where an electrical device is monitored continuously.

As another example, a predetermined period's worth of operating-state-change information generated by a predetermined device may be input by a user to the operating-state-change information acquisition unit 11 of the monitoring device 10 at any timing. The operating-state-change information acquisition unit 11 may acquire the predetermined period's worth of operating-state-change information which is input by a user. The example is suited for a case where a user confirms the state of a predetermined electrical device intermittently.

Subsequently to S11, the monitoring unit 13 determines whether there is an occurrence of a defect in an electrical device using the operating-state-change information acquired in S11 by the operating-state-change information acquisition unit 11 and the standard transition pattern information indicating a pattern of transition between the operating states that is generated in an electrical device without any occurrence of a defect stored in the standard transition pattern storage unit 12 (S12).

For example, the monitoring unit 13 extracts a non-standard transition from a time-series change in the operating states indicated by the operating-state-change information, the non-standard transition being a transition that is not a transition between the operating states indicated by the standard transition pattern information. The monitoring unit 13 determines whether there is an occurrence of a defect in the electrical device based on the extraction result.

Subsequently to S12, the monitoring device 10 outputs the determination result of the monitoring unit 13 in S12 (S13).

Next, an example of real-time processing will be described. First, the operating-state-change information acquisition unit 11 acquires the operating-state-change information indicating a time-series change in the operating states of an electrical device capable of assuming multiple types of operating states, through real-time processing (S11).

For example, the monitoring device 10 or an external device different from the monitoring device 10 acquires measurement data (such as waveform data or an instantaneous value) including at least one of the consumption current, input voltage, and power consumption of an electrical device, in real time, from a measuring sensor installed in each electrical device or a measuring device provided in a distribution board. The monitoring device 10 or the external device generates the operating-state-change information, in real time, using the acquired measurement data and a feature amount (training data) of each electrical device in each operating state which is held in advance. The operating-state-change information acquisition unit 11 acquires the operating-state-change information generated by the monitoring device 10 or the external device in this manner, in real time.

Subsequently to S11, the monitoring unit 13 determines whether a defect has occurred in an electrical device, using the operating-state-change information acquired in S11 by the operating-state-change information acquisition unit 11 and the standard transition pattern information indicating a pattern of transition between operating states generated in an electrical device that is not defective, which is stored by the standard transition pattern storage unit 12 (S12).

That is, the monitoring unit 13 extracts a non-standard transition that is not a transition between operating states indicated by the standard transition pattern information, from a time-series change in the operating states of an electrical device which are specified by operating-state-change information indicating the newly acquired, latest operating state of the electrical device and operating-state-change information indicating the past operating state of the electrical device acquired before then. The monitoring unit 13 then determines whether there is an occurrence of a defect in the electrical device based on the extraction result.

Subsequently to S12, the monitoring device 10 outputs the determination result of the monitoring unit 13 in S12 (S13). For example, every time a non-standard transition is extracted in S12, the monitoring device 10 may output determination results indicating information for specifying the electrical device from which the non-standard transition has been extracted, and the contents, the frequency of occurrence, the time of occurrence and the like of the extracted non-standard transition. Alternatively, when the frequency of extraction of the non-standard transition in S12 exceeds a predetermined threshold, the monitoring device 10 may determine an occurrence of a defect in accordance therewith and output determination results indicating the information for specifying an electrical device, and the contents, the frequency of occurrence, the time of occurrence and the like of the extracted non-standard transition.

Here, an application example of the monitoring device 10 of the present exemplary embodiment will be described. The application example applies similarly to the monitoring devices 10 in all of the following exemplary embodiments.

Figure 10:
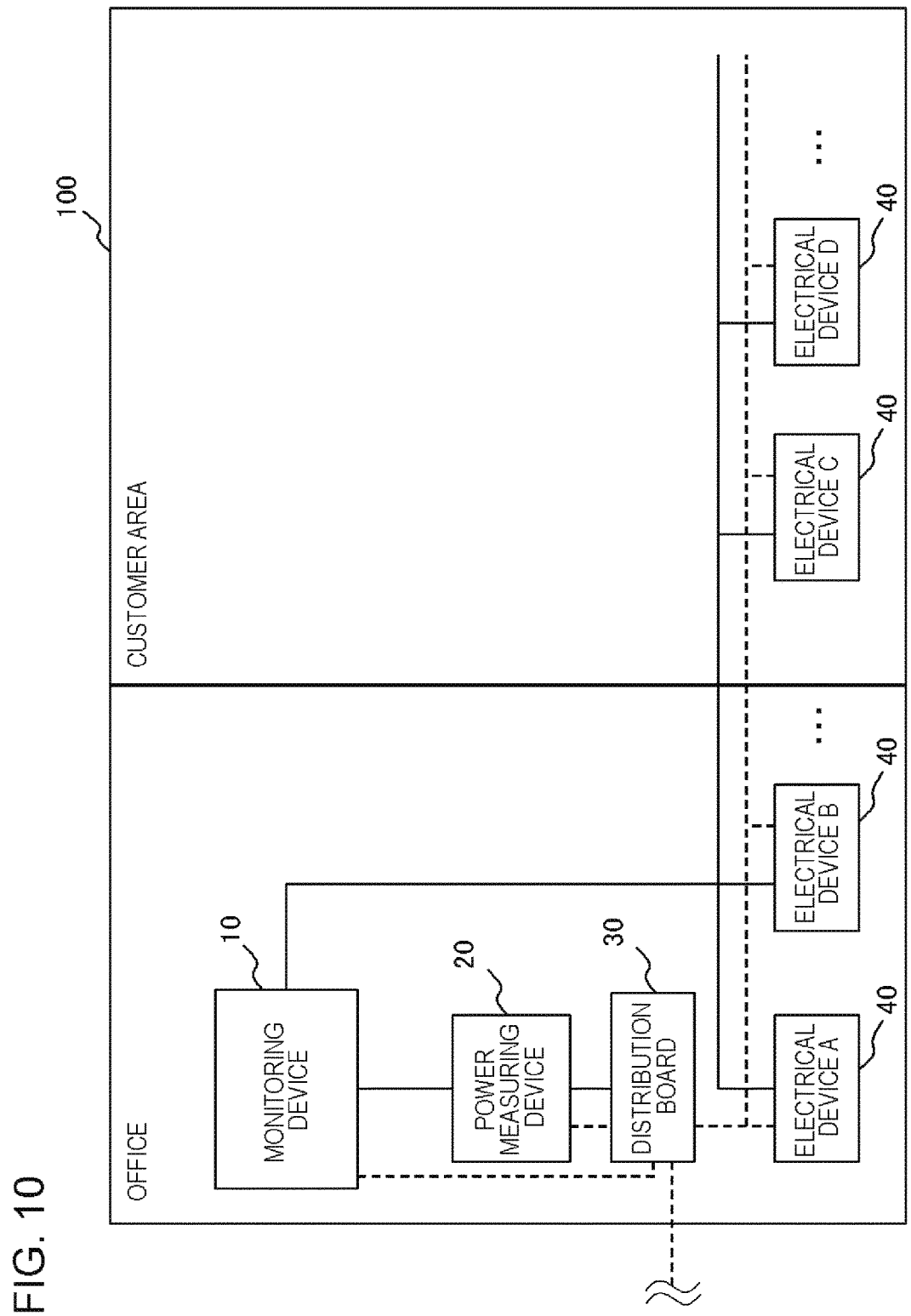
FIG. 10 is a diagram schematically illustrating the overview of an application example of the monitoring device of the present exemplary embodiment.

FIG. 10 shows an example in which the monitoring device 10 is used in a store 100. In the example, the monitoring device 10 is installed in the store. In the drawing, solid lines indicate a flow of data communication, and dotted lines indicate a flow of a supply of power.

The store 100 is divided into a customer area used by customers and an office used only by salesclerks. The store 100 is, for example, a retail store, and a convenience store, a supermarket, a department store or the like corresponds thereto. The office and the customer area have a plurality of electrical devices 40 installed therein. The electrical device 40 is an air conditioner, an electric pot or the like.

The plurality of electrical devices 40 operate by receiving a supply of power through a distribution board 30. In addition, the monitoring device 10 and a power measuring device 20 also operate by receiving a supply of power through the distribution board 30. The distribution board 30 supplies power, received from an external power supply, to the electrical device 40, the power measuring device 20 and the monitoring device 10.

The power measuring device 20 is installed, for example, in the vicinity of the distribution board 30, and acquires measurement data (such as time-series data of an instantaneous value or waveform data) including at least one of the total consumption current, a voltage and the total consumption within the store 100. The measurement data acquired by the power measuring device 20 is input to, for example, the monitoring device 10 in real time. Besides, a measuring sensor that acquires measurement data including at least one of a consumption current, an input voltage and power consumption may be installed in each electrical device 40. The measurement data acquired by each sensor is input to, for example, the monitoring device 10 in real time.

The monitoring device 10 generates operating-state-change information using the acquired measurement data. The monitoring device determines whether there is an occurrence of a defect in the electrical device 40 using the generated operating-state-change information. The determination result is output through a terminal device (not shown) installed within the office. A user (salesclerk) executes a predetermined process in accordance with the output determination result. For example, in a case where the determination result of "Possible defect in electrical device C" is output, the user can quickly check the state of the electrical device C and perform a process such as repair. Meanwhile, the determination result may be transmitted to the head office of the store 100 through a network such as the Internet.

Figure 11:
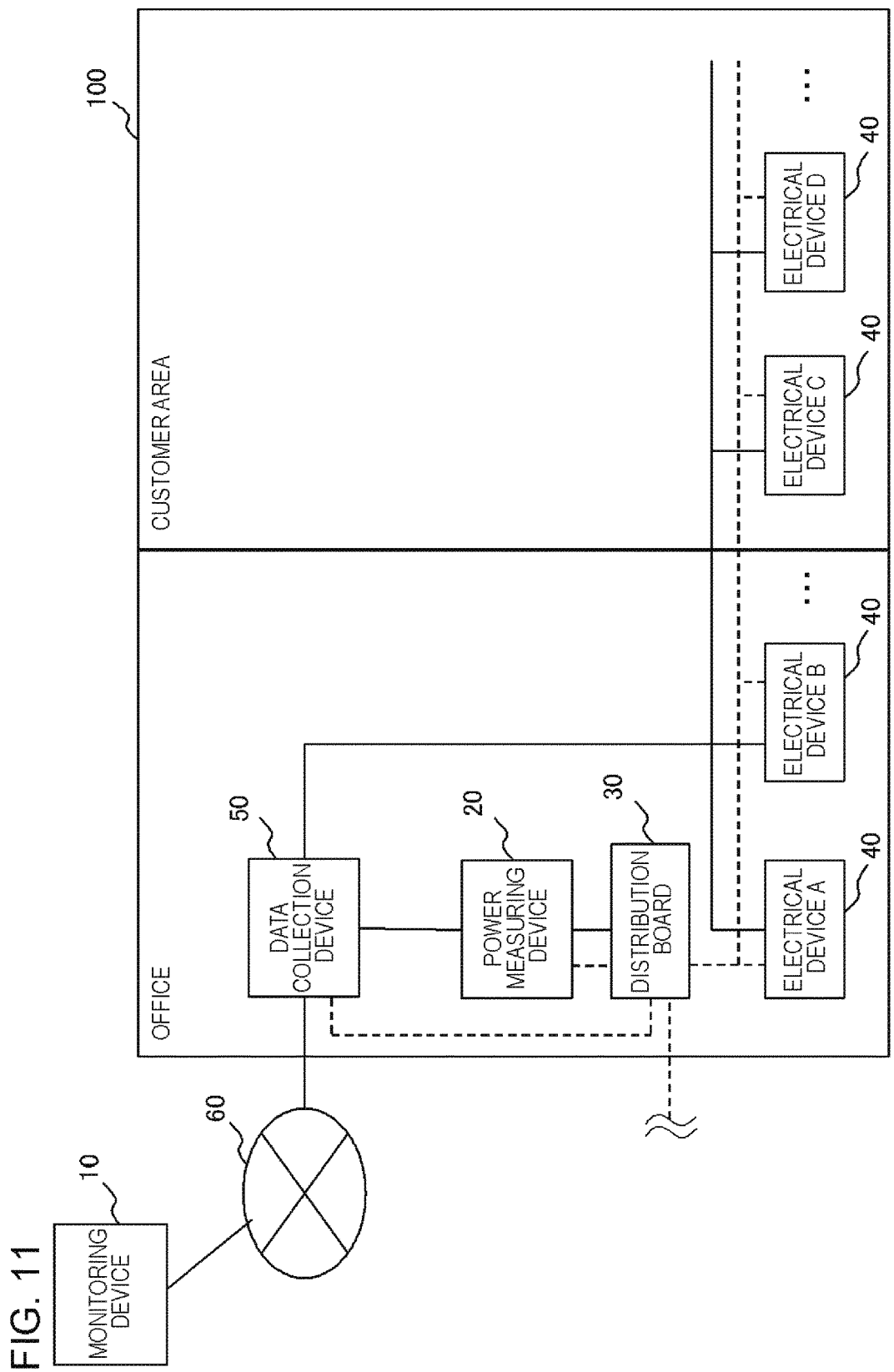
FIG. 11 is a diagram schematically illustrating the overview of the application example of the monitoring device of the present exemplary embodiment.

FIG. 11 shows another example in which the monitoring device 10 is used in the store 100. In the example, the monitoring device 10 is installed in a place different from the store 100. The monitoring device 10 is connected to a data collection device 50 installed in the store 100 through a network 60 such as the Internet.

The store 100 is divided into a customer area used by customers and an office used only by salesclerks. The store 100 is, for example, a retail store, and a convenience store, a supermarket, a department store or the like corresponds thereto. The office and the customer area have a plurality of electrical devices 40 installed therein. The electrical device 40 is an air conditioner, an electric pot or the like.

The plurality of electrical devices 40 operate by receiving a supply of power through the distribution board 30. In addition, the data collection device 50 and the power measuring device 20 also operate by receiving a supply of power through the distribution board 30. The distribution board 30 supplies power, received from an external power supply, to the electrical device 40, the power measuring device 20 and the data collection device 50.

The power measuring device 20 is installed in the distribution board 30, and acquires measurement data (such as time-series data of an instantaneous value or waveform data) including at least one of the total consumption current, a voltage and the total consumption within the store 100. The measurement data acquired by the power measuring device 20 is input to, for example, the data collection device 50 in real time. Besides, a measuring sensor that acquires measurement data including at least one of a consumption current, an input voltage and power consumption may be installed in each electrical device 40. The measurement data acquired by each sensor is input to, for example, the data collection device 50 in real time.

The data collection device 50 generates operating-state-change information using the acquired measurement data. The generated operating-state-change information is transmitted to the monitoring device 10 at a predetermined timing. The monitoring device 10 determines whether there is an occurrence of a defect in the electrical device 40, using the acquired operating-state-change information. The determination result is input to a terminal device (not shown) installed within the office through the network 60. The determination result is output to the terminal device. A user (salesclerk) executes a predetermined process in accordance with the output determination result. Meanwhile, the determination result may be transmitted to a head office of the store 100 through a network such as the Internet.

In a modification example of the example of FIG. 11, the data collection device 50 may transmit the acquired measurement data to the monitoring device 10 without generating the operating-state-change information. The monitoring device 10 may generate the operating-state-change information using the acquired measurement data.

In another modification example of the example of FIG. 11, the monitoring device 10 may be installed in the store 100. That is, an example can also be considered in which both the monitoring device 10 and the data collection device 50 are installed in the store 100.

According to the present exemplary embodiment described above, whether or not there is an occurrence of a defect in an electrical device can be determined using an unprecedented method. A user can quickly perform a process such as repair with respect to an electrical device determined as possibly being defective based on the determination result. As a result, it is possible to reduce unnecessary power consumption consumed by a defective electrical device.

In addition, in the present exemplary embodiment, the determination of the occurrence of a defect in an electrical device is not immediately made when a non-standard transition is detected once but is made when the frequency of occurrence of the non-standard transition exceeds a predetermined threshold. For example, the non-standard transition may occur in an electrical device depending on a user's usage pattern different than the normal usage. If the determination result of "Possible defect in electrical device" is output in accordance with the non-standard transition due to a factor that is not caused by a defect of the electrical device, unnecessary work (such as examining the electrical device) is imposed on a user, which is not desirable. In the present exemplary embodiment, when the frequency of occurrence of the non-standard transition exceeds a predetermined threshold, it can then be determined that a defect has occurred in an electrical device. Therefore, it is possible to solve a problem of a noise component which is a non-standard transition caused by a factor different from a defect of an electrical device, thus allowing detection of a defect of an electrical device with a high degree of accuracy.

Second Exemplary Embodiment

Figure 22:
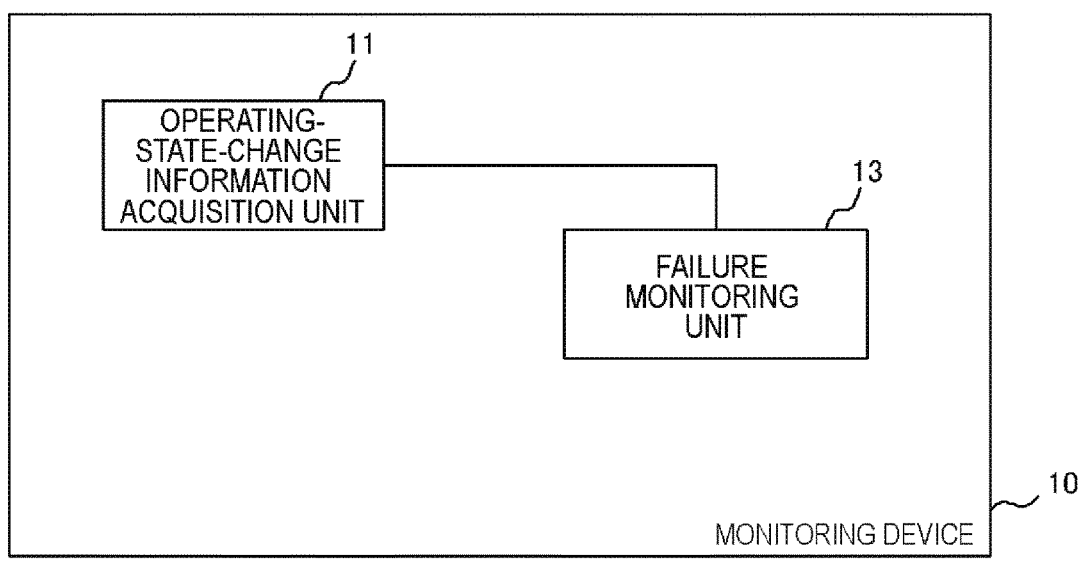
FIG. 22 is an example of a functional block diagram of the monitoring device of the present exemplary embodiment.

A monitoring device 10 of the present exemplary embodiment is different from that in the first exemplary embodiment, in that the device has a function of detecting an undesirable usage of an electrical device. An example of a functional block diagram of the monitoring device 10 of the present exemplary embodiment is shown in FIG. 2 or 22 similarly to the first exemplary embodiment. The configuration of the operating-state-change information acquisition unit 11 is the same as that in the first exemplary embodiment.

The standard transition pattern storage unit 12 stores the standard transition pattern information indicating a threshold of the frequency of occurrence of a standard transition, instead of or in addition to the standard transition pattern information described in the first exemplary embodiment.

This threshold indicates the upper limit of the standard transition appearing in a preferred usage. That is, if a standard transition is detected exceeding this threshold, it means that the usage is undesirable. FIG. 23 shows an example of the standard transition pattern information. In FIG. 23, the standard transition pattern information of an electric pot is shown. According to the standard transition pattern information, for example, if the standard transition from the heating state to the temperature maintaining state occurs in excess of ten times per hour, it means that the usage of the electric pot is undesirable.

The monitoring unit 13 determines whether a transition between the operating states of an electrical device is within the standard, that is, whether the frequency of occurrence of the standard transition exceeds a predetermined threshold by using the standard transition pattern information indicating a threshold of the frequency of occurrence of the standard transition and the operating-state-change information, instead of or in addition to the configuration of the first exemplary embodiment. In a case where the frequency of occurrence of the standard transition exceeds the predetermined threshold, the monitoring unit 13 determines that the transition between the operating states of an electrical device is not within the standard.

The monitoring unit 13 may determine that the usage of an electrical device is undesirable in accordance with the frequency of occurrence of the standard transition exceeding the threshold once or in accordance with the standard transition exceeding the threshold a predetermined number of times (option of design).

When the monitoring unit 13 determines that the usage of a predetermined electrical device is undesirable, the monitoring device 10 may output such determination result. An output unit is the same as that in the first exemplary embodiment.

An example of the determination result to be output may include an example of "Possible undesirable usage of electric pot. Standard transition from standby state to heating state has been detected 50 times between 13 o'clock and 14 o'clock on Feb. 4, 2014." Meanwhile, in a case where a defect has not been detected, the determination result of "Preferable usage of electric pot. No non-standard transition has been found on Feb. 4, 2014." may be output.

A flow of processes of the present exemplary embodiment is the same as that in the first exemplary embodiment. According to the present exemplary embodiment, it is possible to achieve the same operational effects as those in the first exemplary embodiment. In addition, it is possible to easily detect an undesirable usage an electrical device. As a result, it is possible to alter the way of using the electrical device and to take measures such as notifying those nearby to alter the usage of the device.

Third Exemplary Embodiment

A monitoring device 10 of the present exemplary embodiment has a function of outputting a determination result of a monitoring unit 13 and receiving an input of feedback information indicating whether the determination result is correct. The monitoring device 10 of the present exemplary embodiment has a function of correcting the determination standard of the monitoring unit 13 in accordance with the contents indicated by the feedback information.

Figure 12:
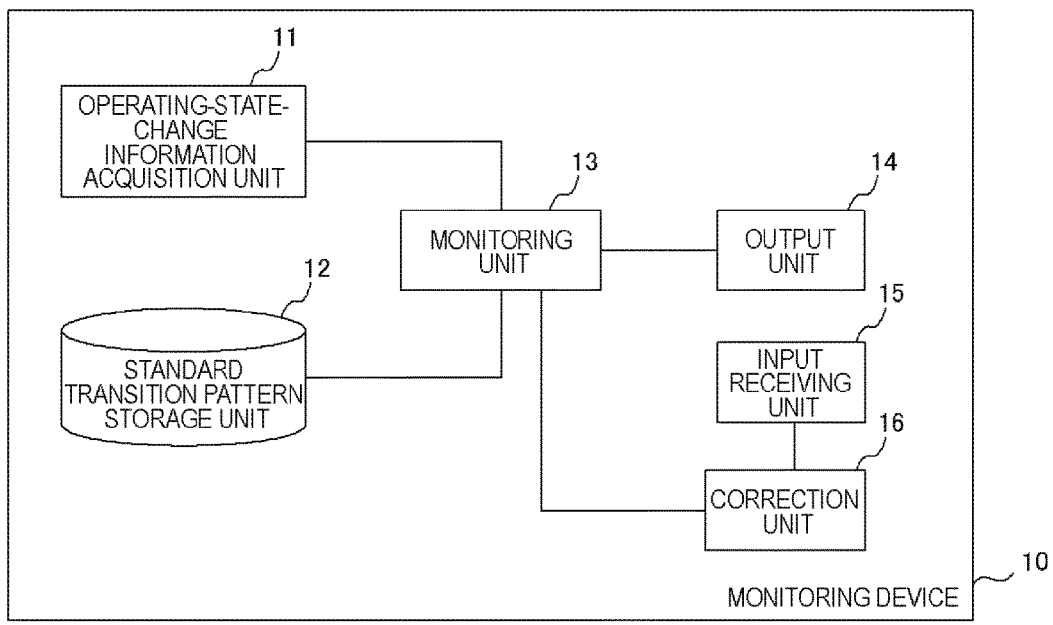
FIG. 12 is an example of a functional block diagram of the monitoring device of the present exemplary embodiment.

FIG. 12 shows an example of a functional block diagram of the monitoring device 10 of the present exemplary embodiment. As shown in the drawing, the monitoring device 10 includes an operating-state-change information acquisition unit 11, a standard transition pattern storage unit 12, a monitoring unit 13, an output unit 14, an input receiving unit 15, and a correction unit 16. Meanwhile, similarly to the first and second exemplary embodiments, the monitoring device 10 may or may not include the standard transition pattern storage unit 12. The configurations of the operating-state-change information acquisition unit 11 and the standard transition pattern storage unit 12 are the same as those in the first and second exemplary embodiments.

The output unit 14 outputs the determination result of the monitoring unit 13. For example, an output device such as a display, a printer, or a mailer can be used.

The input receiving unit 15 receives a user's input indicating the validity of the determination result. For example, regarding the determination result indicating that "a defect (such as a failure or an undesirable usage) has occurred in a certain electrical device" or "a defect has not occurred in a certain electrical device", the input receiving unit 15 receives the validity of the determination result indicating that "a defect has occurred in the electrical device" or "a defect has not occurred in the electrical device".

The correction unit 16 corrects a standard of determination made by the monitoring unit 13 in accordance with the contents of a user's input received by the input receiving unit 15. For example, the correction unit 16 corrects a threshold of the frequency of occurrence (see FIG. 8) described in the first exemplary embodiment, in accordance with the contents of a user's input received by the input receiving unit 15. Specifically, with respect to a determination result of "an occurrence of a defect (an occurrence of a failure) in a certain electrical device", when an input of the validity of the determination result of "no defect has occurred (no failure has occurred) in the electrical device" has been received, the correction unit 16 may increase the threshold of the frequency of occurrence. On the other hand, with respect to a determination result of "no defect has occurred (no failure has occurred) in a certain electrical device", when an input of the validity of the determination result of "a defect has occurred (failure has occurred) in the electrical device" has been received, the correction unit 16 may reduce the threshold of the frequency of occurrence. In a case where the determination result and the validity of the determination result are identical with each other in terms of "no defect has occurred (no failure has occurred)" or "a defect has occurred (failure has occurred)", the correction unit 16 may maintain the threshold of the frequency of occurrence as it is. Similarly, the correction unit 16 may correct the standard transition pattern information shown in FIG. 23.

The monitoring unit 13 determines whether a defect has occurred in an electrical device based on a determination standard corrected by the correction unit 16. Other configurations of the monitoring unit 13 are the same as those in the first and second exemplary embodiments.

According to the present exemplary embodiment, it is possible to achieve the same operational effects as those in the first and second exemplary embodiments. In addition, according to the present exemplary embodiment, with repeated usage, the determination standard of the monitoring unit 13 may be more properly adjusted. As a result, it is possible to increase the determination accuracy for the presence or absence of a defect of an electrical device.

Fourth Exemplary Embodiment

First, the outline of the present exemplary embodiment will be described. The inventors have examined electrical devices capable of assuming multiple types of operating states, and have found that, when "a predetermined operation (for example, maintenance of a certain electrical device) is performed, a combination of the operating states of each of a plurality of electrical devices may be a predetermined pattern (standard combination pattern)".

Figure 17:
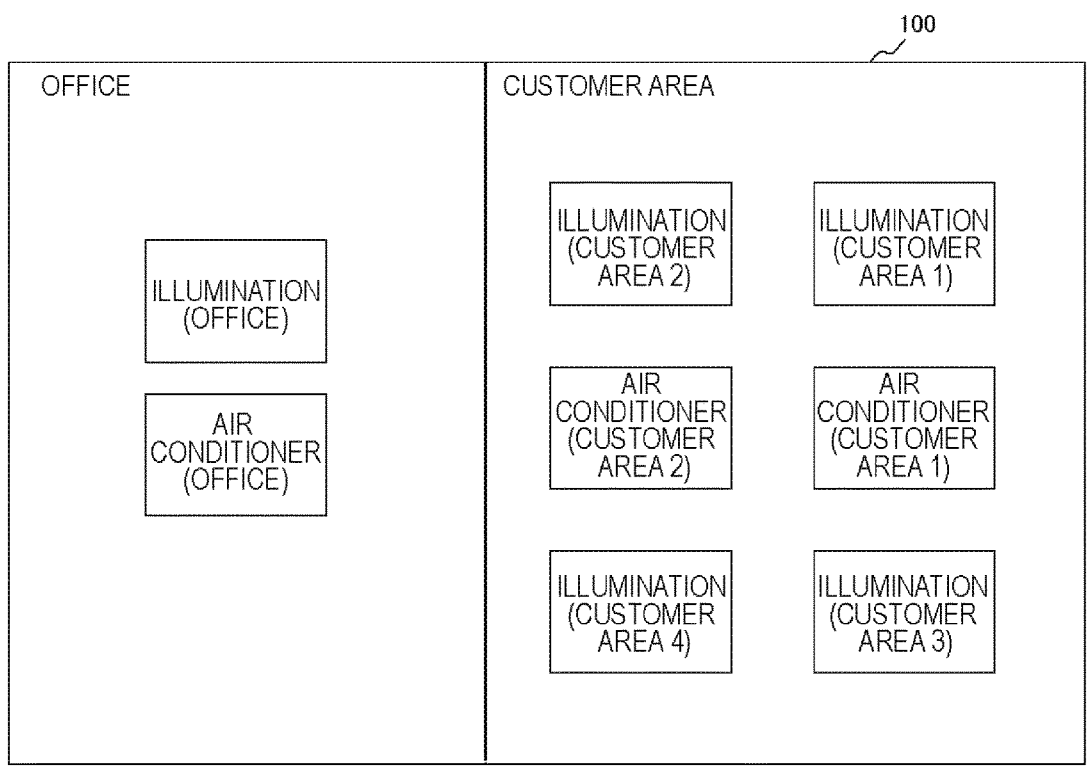
FIG. 17 is a diagram schematically illustrating an example of a floor diagram of a store using the monitoring device of the present exemplary embodiment.

Here, an example will be described with standard to FIG. 17. FIG. 17 shows a floor diagram of the store 100 such as a convenience store. In a case of the example shown in FIG. 17, one air conditioner and one illumination device are installed in the office. Two air conditioners and four illumination devices are installed in the customer area.

For example, during cleaning (maintenance) of the air conditioner provided in the store 100, the operating state of the air conditioner enters a standby state (power-OFF state). The illumination device near the air conditioner enters a power-ON state, since the cleaning (maintenance) of the air conditioner is often performed during the night when there are less number of customers. For example, when cleaning (maintenance) of the air conditioner installed in the office is performed, the operating state of the air conditioner enters the standby state (power-OFF state), and the illumination device (in the office) near the air conditioner enters the power-ON state.

In addition, as shown in FIG. 17, a plurality of air conditioners are provided in the store 100 such as a convenience store, and the air conditioners may be cleaned one by one. Therefore, when cleaning (maintenance) of one air conditioner is performed, the operating state of the air conditioner enters the standby state (power-OFF state), and the operating state of another air conditioner is in an operating state (for example, cooling (high), heating (high)) which is greater in strength than a normal state (state where all the air conditioners are operating). For example, when cleaning (maintenance) of the air conditioner (customer area 1) shown in FIG. 17 is performed, the operating state of the air conditioner (customer area 1) enters the standby state (power-OFF state), and the operating state of another air conditioner (customer area 2) enters an operating state (for example, air conditioning (high), heating (high)) which is greater in strength than a normal state (for example, air conditioning (medium), heating (medium), or the like).

The monitoring device 10 of the present exemplary embodiment is devised in view of such circumstances, and is configured to determine, by monitoring a combination of the operating states of a plurality of electrical devices, whether or not a predetermined operation (for example, maintenance of an electrical device) has been executed.

Figure 13:
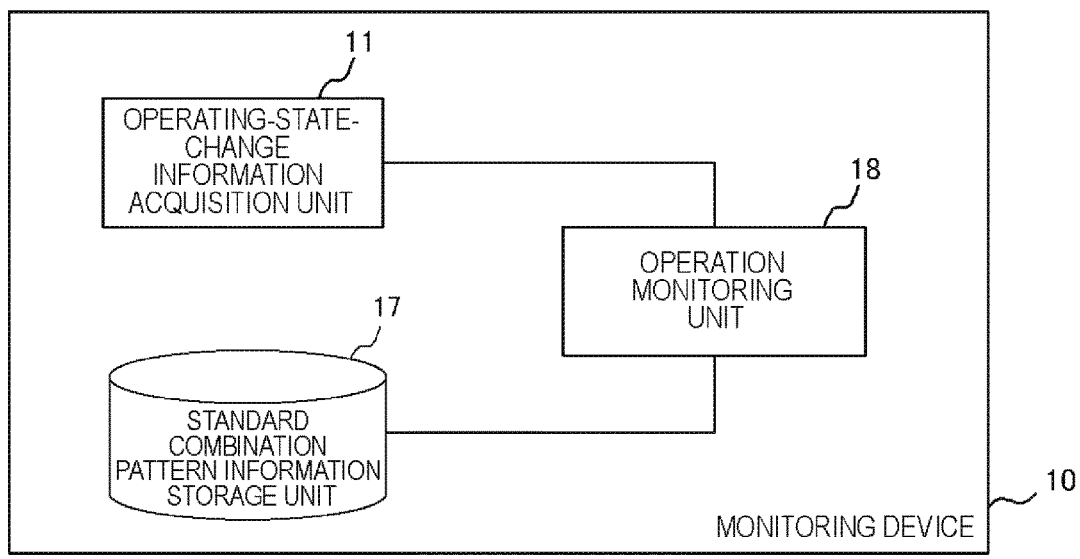
FIG. 13 is an example of a functional block diagram of the monitoring device of the present exemplary embodiment.

Hereinafter, the configuration of the monitoring device of the present exemplary embodiment will be described in detail. FIG. 13 shows an example of a functional block diagram of the monitoring device 10 of the present exemplary embodiment. As shown in the drawing, the monitoring device 10 of the present exemplary embodiment includes an operating-state-change information acquisition unit 11, a standard combination pattern information storage unit 17, and an operation monitoring unit 18. Meanwhile, the monitoring device 10 may or may not include the standard combination pattern information storage unit 17.

The operating-state-change information acquisition unit 11 acquires operating-state-change information indicating a time-series change in the operating state of each of multiple types of electrical devices capable of assuming multiple types of operating states. The operating-state-change information acquisition unit 11 of the first to third exemplary embodiments acquires the operating-state-change information of at least one electrical device, but the operating-state-change information acquisition unit 11 of the present exemplary embodiment is different in that it acquires the operating-state-change information of multiple types of electrical devices. The operating-state-change information of multiple types of electrical devices includes time information, allowing the occurrence time of each operating state to be specified. It is possible to synchronize the operating-state-change information of multiple types of electrical devices by using this time information. Other configurations of the operating-state-change information acquisition unit 11 of the present exemplary embodiment are the same as the configurations of the operating-state-change information acquisition unit 11 of first to third exemplary embodiments.

The standard combination pattern information storage unit 17 stores standard combination pattern information indicating a combination pattern obtained by combining the operating states generated in each of a plurality of electrical devices during a predetermined operation (for example, during maintenance of a first electrical device). The standard combination pattern information storage unit 17 stores, for example, information indicating a combination pattern obtained by combining the operating states simultaneously occurring in each of a plurality of electrical devices during the time of maintenance of the first electrical device, as the standard combination pattern information.

FIG. 14 schematically shows an example of the standard combination pattern information. The shown standard combination pattern information includes a maintenance column indicating the contents of the maintenance and a combination column indicating a maintenance combination pattern generated during each maintenance operation.

According to the example shown in FIG. 14, it can be understood that, during the cleaning execution of the air conditioner installed in the office (see FIGS. 10 and 11), the operating state of the air conditioner installed in the office enters the power-OFF state (standby state), and the operating state of the illumination device installed in the office enters the power-ON state.

FIG. 15 schematically shows another example of the standard combination pattern information. The shown standard combination pattern information includes a maintenance column indicating the contents of the maintenance, a combination column indicating a maintenance combination pattern indicated during each maintenance operation, and a duration time column indicating a period of time for which the maintenance combination pattern generated during each maintenance operation is to be continued.

According to the example shown in FIG. 15, it can be understood that, during the cleaning execution of the air conditioner installed in the office (see FIGS. 10 and 11), the operating state of the air conditioner installed in the office is enters the power-OFF state (standby state), and the operating state of the illumination device installed in the office enters the power-ON state. It can be understood that, during the cleaning execution of the air conditioner installed in the office (see FIGS. 10 and 11), the pattern of combination of the two electrical devices is to be continued for more than 20 minutes.

Although in FIGS. 14 and 15, the pattern of combination of the two electrical devices is shown, the pattern of combination of three or more electrical devices can also be used as the standard combination pattern information.

Referring back to FIG. 13, the operation monitoring unit 18 determines whether a predetermined operation (for example, maintenance of the first electrical device) is executed using the operating-state-change information and the standard combination pattern information. For example, the operation monitoring unit 18 can acquire the operating-state-change information from the operating-state-change information acquisition unit 11 included in the monitoring device 10 and acquire the standard combination pattern information from the standard combination pattern information storage unit 17. Meanwhile, in a case where the monitoring device 10 does not include the standard combination pattern information storage unit 17, a device different from the monitoring device 10 may include the standard combination pattern information storage unit 17. The operation monitoring unit 18 may communicate with the different device and acquire the standard combination pattern information from the standard combination pattern information storage unit 17 included in the different device. Further, the operation monitoring unit 18 may appropriately generate the standard combination pattern information.

The operation monitoring unit 18 extracts, for example, a combination pattern (combination of the operating states) during a predetermined operation (for example, maintenance) indicated by the standard combination pattern information (see FIGS. 14 and 15), from a time-series change in the operating states indicated by the operating-state-change information of multiple types of electrical devices.

For example, in a case where the combination pattern (combination of the operating states) of the predetermined operation can be extracted, the operation monitoring unit 18 may determine that the predetermined operation has been executed. On the other hand, in a case where the combination pattern (combination of the operating states) of the predetermined operation is not able to be extracted, the operation monitoring unit 18 may determine that the predetermined operation has not been executed.

Besides, in a case where the combination pattern (combination of the operating states) of the predetermined operation is able to be extracted, the operation monitoring unit 18 may calculate the duration time of the combination pattern. In a case where the duration time exceeds a predetermined threshold (for example, duration time of FIG. 15) corresponding to the predetermined operation, the operation monitoring unit 18 may determine that the predetermined operation has been executed. On the other hand, in a case where the duration time does not exceed the predetermined threshold corresponding to the predetermined operation, and a case where the combination pattern (combination of the operating states) of the predetermined operation is not able to be extracted, the operation monitoring unit 18 may determine that the predetermined operation has not been executed.

Here, a description will be given of the concept of a process in which the execution of maintenance (predetermined operation) is determined by the operation monitoring unit 18, using the operating-state-change information of FIG. 16 and the standard combination pattern information shown in FIGS. 14 and 15. Here, the unit time of the operating-state-change information shown in FIG. 16 is assumed to be five minutes. That is, it is shown that each operating state shown within the brackets continues for five minutes.

The operation monitoring unit 18 analyzes the operating-state-change information of FIG. 16 and searches for simultaneously occurring operating states of a combination pattern (combination of the operating states) associated with, for example, maintenance of "air conditioner (office) cleaning" shown in FIG. 14. In the example shown in FIG. 16, a combination pattern (combination of the operating states) associated with "air conditioner (office) cleaning" can be seen as occurring at the point in time of one forty-five ("01:45" in the drawing). Therefore, the operation monitoring unit 18 determines that the maintenance of "air conditioner (office) cleaning" has been executed.

On the other hand, in a case where the standard combination pattern information shown in FIG. 15 is used, the operation monitoring unit 18 calculates the duration of the combination pattern (combination of the operating states) associated with "air conditioner (office) cleaning" occurring at the point in time of one forty-five ("01:45" in the drawing). The operation monitoring unit 18 determines whether the calculated duration time exceeds the duration time (see FIG. 15) associated with "air conditioner (office) cleaning". In the case the calculated duration time is in excess of the duration time associated with "air conditioner (office) cleaning", the operation monitoring unit 18 determines that the maintenance "air conditioner (office) cleaning" has been executed. In the case the calculated duration time does not exceed the duration time associated with "air conditioner (office) cleaning", the operation monitoring unit 18 determines that the maintenance "air conditioner (office) cleaning" has not been executed.

Meanwhile, in a case where the schedule of maintenance of each electrical device (for example, cleaning of the air conditioner (office) is executed between 2 o'clock and 3 o'clock on Feb. 10, 2014) is set in advance, the operation monitoring unit 18 can determine whether the maintenance has been executed, by using only the operating-state-change information of the scheduled date of the maintenance. With this configuration, the amount of data to be processed can be reduced, and the processing speed is improved which is preferable. Meanwhile, in this case, the operation monitoring unit 18 can acquire information indicating each maintenance schedule through a user's input. In addition, not only time information but also year-month-day information may be associated with the operating-state-change information which is acquired by the operating-state-change information acquisition unit 11.

The monitoring device 10 can output the determination result of the operation monitoring unit 18 to a user. An output method may include displaying the result on a display included in the monitoring device 10, displaying the result on a display connected to the monitoring device 10, transmitting the result to an address (such as an e-mail address) previously registered in the monitoring device 10, outputting the result through a printer, or the like. The determination result to be output may include a time at which a predetermined operation has been executed (time at which a combination pattern associated with each predetermined operation has occurred) or the duration time of the predetermined operation, in addition to the presence or absence of execution for each predetermined operation (for example, maintenance).

An example of the determination results to be output may include an example of "The cleaning of the air conditioner (office) was executed on Feb. 5, 2014. The execution start time was about one forty-five, and the duration time was about 30 minutes.", an example of "The cleaning of the air conditioner (office) was not executed on Feb. 5, 2014.", or the like.

A flow of processes of the monitoring device 10 of the present exemplary embodiment may be the same as those in the first to third exemplary embodiments. Thus, the description thereof will not be repeated.

According to the present exemplary embodiment described above, the presence or absence of the execution of a predetermined operation (for example, maintenance of an electrical device) can be detected using an unprecedented method. A user (supervisor) can recognize the presence or absence of the execution of a predetermined operation based on the detection result. By the user (supervisor) instructing another user to appropriately execute a predetermined operation, a disadvantage of neglecting a state of an unexecuted predetermined operation may be eliminated.

In addition, in the present exemplary embodiment, the determination that the predetermined operation has been executed is not immediately made when a combination pattern corresponding to the predetermined operation is detected once but is made when the state has continued for a predetermined period of time. Therefore, in a case of an instantaneous occurrence of a predetermined combination pattern, it is possible to reduce the inconvenience of an erroneous determination that the predetermined operation has been executed. In addition, in a case of an insufficient predetermined operation inadequately performed in a short time, it is possible to reduce the inconvenience of a determination being made that the predetermined operation has been executed.

Meanwhile, a method of checking the presence or absence of the execution of a predetermined operation may include an example of using an image captured by a monitoring camera. However, in a case of this example, there is a possibility of increased psychological burden on a worker performing the predetermined operation, lowering of the worker's morale, and the occurrence of the problem of privacy. The present exemplary embodiment on the other hand is superior in that the presence or absence of the execution of a predetermined operation can be checked without causing such problems.

Fifth Exemplary Embodiment

A monitoring device 10 of the present exemplary embodiment has a function of outputting a determination result of the operation monitoring unit 18 and receiving an input of feedback information indicating whether the determination result is correct. In addition, the monitoring device 10 of the present exemplary embodiment has a function of correcting a determination standard of the operation monitoring unit 18 in accordance with the contents indicated by the feedback information.

Figure 18:
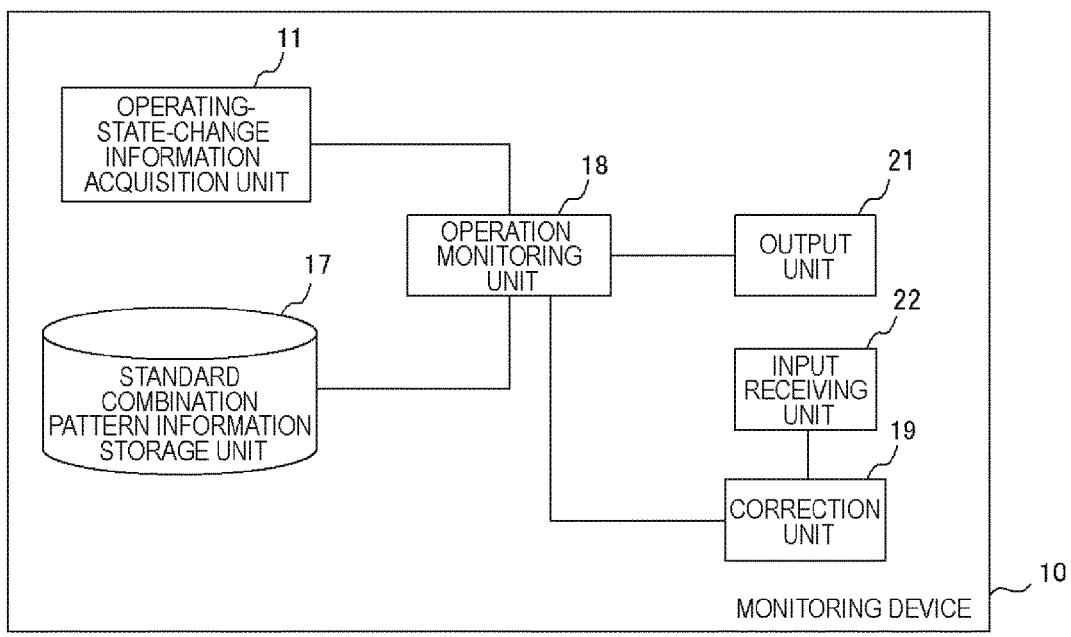
FIG. 18 is an example of a functional block diagram of the monitoring device of the present exemplary embodiment.

FIG. 18 shows an example of a functional block diagram of the monitoring device 10 of the present exemplary embodiment. As shown in the drawing, the monitoring device 10 includes an operating-state-change information acquisition unit 11, a standard combination pattern information storage unit 17, an operation monitoring unit 18, an output unit 21, an input receiving unit 22, and a correction unit 19. Meanwhile, the monitoring device 10 may or may not include the standard combination pattern information storage unit 17. The configurations of the operating-state-change information acquisition unit 11 and the standard combination pattern information storage unit 17 are the same as those in the fourth exemplary embodiment.

The output unit 21 outputs the determination result of the operation monitoring unit 18. For example, an output device such as a display, a printer, or a mailer can be used.

The input receiving unit 22 receives a user's input indicating the validity of the determination result. For example, with respect to the determination result indicating that "a certain predetermined operation has been executed" or "a certain predetermined operation has not been executed", the input receiving unit 22 receives the validity of the determination result indicating that "the predetermined operation has not been executed" or "the predetermined operation has been executed".

The correction unit 19 corrects a standard of the determination made by the operation monitoring unit 18 in accordance with the contents of a user's input received by the input receiving unit 22. For example, the correction unit 19 corrects a threshold (see FIG. 15) of the duration time of each maintenance operation described in the fourth exemplary embodiment, in accordance with the contents of a user's input received by the input receiving unit 22. Specifically, with respect to the determination result of "a certain predetermined operation has been executed", in a case of receiving an input of the validity of the determination result of "the predetermined operation has not been executed", the correction unit 19 may increase the threshold of the duration time. On the other hand, with respect to the determination result of "a certain predetermined operation has been executed", in a case of receiving an input of the validity of the determination result "the predetermined operation has not been executed", the correction unit 19 may reduce the threshold of the duration time. In a case where the determination result and the validity of the determination result are identical with each other in terms of being "executed" or "not executed", the correction unit 19 may maintain the threshold of the duration time as it is.

The operation monitoring unit 18 determines whether a predetermined operation (for example, maintenance of an electrical device) has been executed based on the corrected determination standard of the correction unit 19. Other configurations of the operation monitoring unit 18 are the same as those in the fourth exemplary embodiment.

According to the present exemplary embodiment, it is possible to achieve the same operational effects as those in the fourth exemplary embodiment. In addition, according to the present exemplary embodiment, with repeated usage, the determination standard of the operation monitoring unit 18 may be more properly adjusted. As a result, it is possible to increase the determination accuracy for the presence or absence of the execution of a predetermined operation.

Sixth Exemplary Embodiment

The present exemplary embodiment relates to a monitoring system including the monitoring device 10 and the data collection device 50 which are described in the first to fifth exemplary embodiments. FIG. 11 shows one application example of the monitoring system of the present exemplary embodiment.

In a case of the shown example, the data collection device 50 is installed in the store 100 where an electrical device 40 to be monitored is installed. The electrical device 40 operates by receiving a supply of power through the distribution board 30 installed in the store 100. The data collection device 50 may also receive a supply of power through the distribution board 30. The power measuring device 20 installed in the distribution board 30 measures measurement data (such as time-series data of an instantaneous value or waveform data) including any of the total consumption current, a voltage, and the total consumption of the electrical device 40 or the like that receives a supply of power through the distribution board 30. Meanwhile, a measuring sensor that measures measurement data (such as an instantaneous value or waveform data) including any of the consumption current, input voltage, and power consumption of each electrical device may be installed in each of the electrical devices 40.

The data collection device 50 acquires the time-series measurement data from the measuring sensor installed in the power measuring device 20 or each of the electrical devices 40. The data collection device 50 may generate the operating-state-change information of each of the electrical devices 40 using the acquired measurement data.

The monitoring device 10 is installed in a place different from the store 100 where an electrical device 40 to be monitored is installed. The monitoring device 10 is installed in, for example, a center that supervises a plurality of the stores 100, a place managed by a service provider that provides a service using the monitoring device 10, or the like. The monitoring device 10 may be, for example, a so-called cloud server.

The monitoring device 10 and the data collection device 50 are connected to each other through the network 60 such as the Internet or a LAN. The data collection device 50 transmits the operating-state-change information of each of the electrical devices 40, generated using the acquired measurement data or the acquired measurement data, to the monitoring device 10.

The monitoring device 10 having received the operating-state-change information of each of the electrical devices 40 from the data collection device 50 executes the process described in the first to fifth exemplary embodiments. On the other hand, the monitoring device 10 having received the measurement data from the data collection device 50 generates the operating-state-change information of each of the electrical devices 40 using the acquired measurement data. The process described in the first to fifth exemplary embodiments is executed using the generated operating-state-change information.

In a modification example, the monitoring device 10 can also be installed in the store 100 where an electrical device 40 to be monitored is installed. In this case, the monitoring device 10 and the data collection device 50 may be connected to each other through a LAN.

Figure 19:
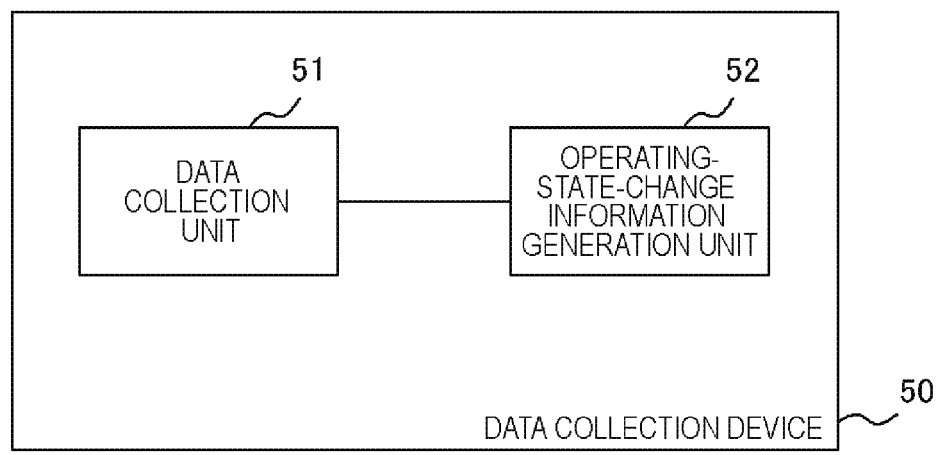
FIG. 19 is an example of a functional block diagram of a data collection device of the present exemplary embodiment.

Hereinafter, an example of the configuration of the data collection device 50 will be described. FIG. 19 shows an example of a functional block diagram of the data collection device 50. As shown in the drawing, the data collection device 50 includes a data collection unit 51 and an operating-state-change information generation unit 52.

The data collection unit 51 acquires measurement data (such as time-series data of an instantaneous value or waveform data) including at least one of the consumption current, input voltage and power consumption of the electrical device 40 to be monitored. For example, the data collection unit 51 may acquire the measurement data from the power measuring device 20 shown in FIG. 11, and may acquire the measurement data from the measuring sensor installed in each of the electrical devices 40 to be monitored.

The measurement data acquired from the power measuring device 20 is one piece of time-series data in which pieces of measurement data of a plurality of electrical devices 40 to be monitored are mixed (added together). Meanwhile, the measurement data acquired from the power measuring device 20 may be a plurality of pieces of time-series measurement data for each branch of the distribution board 30. In this case, pieces of measurement data of the plurality of electrical devices 40 are also mixed into each of a plurality of time-series measurement data. Hereinafter, the time-series measurement data in which pieces of measurement data of the plurality of electrical devices 40 are mixed is referred to as mixed measurement data.

On the other hand, the measurement data acquired from the measuring sensor installed in each of the electrical devices 40 to be monitored is separated for each of the electrical devices 40 to be monitored. That is, the measurement data acquired from the measuring sensor are a plurality of pieces of time-series measurement data corresponding to each of the plurality of electrical devices 40 to be monitored. Hereinafter, the time-series measurement data corresponding to each of the plurality of electrical devices 40 is referred to as individual measurement data.

The operating-state-change information generation unit 52 acquires measurement data from the data collection unit 51 and generates the operating-state-change information using the measurement data. For example, as shown in FIG. 20, the operating-state-change information generation unit 52 holds a feature amount (training data) of each of a plurality of operating states included in each of the electrical devices 40. The operating-state-change information generation unit 52 can generate the operating-state-change information of each electrical device using the measurement data and the feature amount (training data) as shown in FIG. 20.

The feature amount can be extracted from measurement data including at least one of a consumption current (such as an instantaneous value or waveform data), an input voltage (such as an instantaneous value or waveform data), and power consumption (such as an instantaneous value or waveform data) which are measured during operation of each of the electrical devices 40 in each operating state. For example, the feature amount may be a frequency strength and a phase (harmonic component) of the consumption current, a phase, a change in the consumption current, an average value, a peak value, an effective value, a peak factor, a waveform factor, a convergence time of current change, an electrification time, a position of a peak, a time difference between the peak position of a voltage and the peak position of the consumption current, a power factor, a power consumption value, a current consumption value, and the like.

As a method of generating the feature amount (training data), all technique of the related art can be adopted, and an example will be described below.

Here, an example of generating the feature amount (training data) of an electric pot will be described. That the electric pot may assume three states of a standby state, a heating state, and a temperature maintaining state is previously understood. In addition, it is also understood that power consumption values during the respective operating states are different from each other and increase in magnitude in the order of standby state→temperature maintaining state→heating state. Based on the characteristics of such an electric pot, it can be understood that each operating state is able to be identified, for example, based on the power consumption values. Consequently, herein, a power consumption value during each operating state is calculated as the feature amount (training data) during each operating state of the electric pot. Meanwhile, the following process can be executed by, for example, the data collection device 50.

In the process, the data collection device 50 divides a power consumption value zone (from 0 W to a maximum power consumption value) consumed by the electric pot into three parts and then associates each operating state with each of the parts, to thereby generate the feature amount (training data: power consumption value zone) in each operating state.

Figure 21:
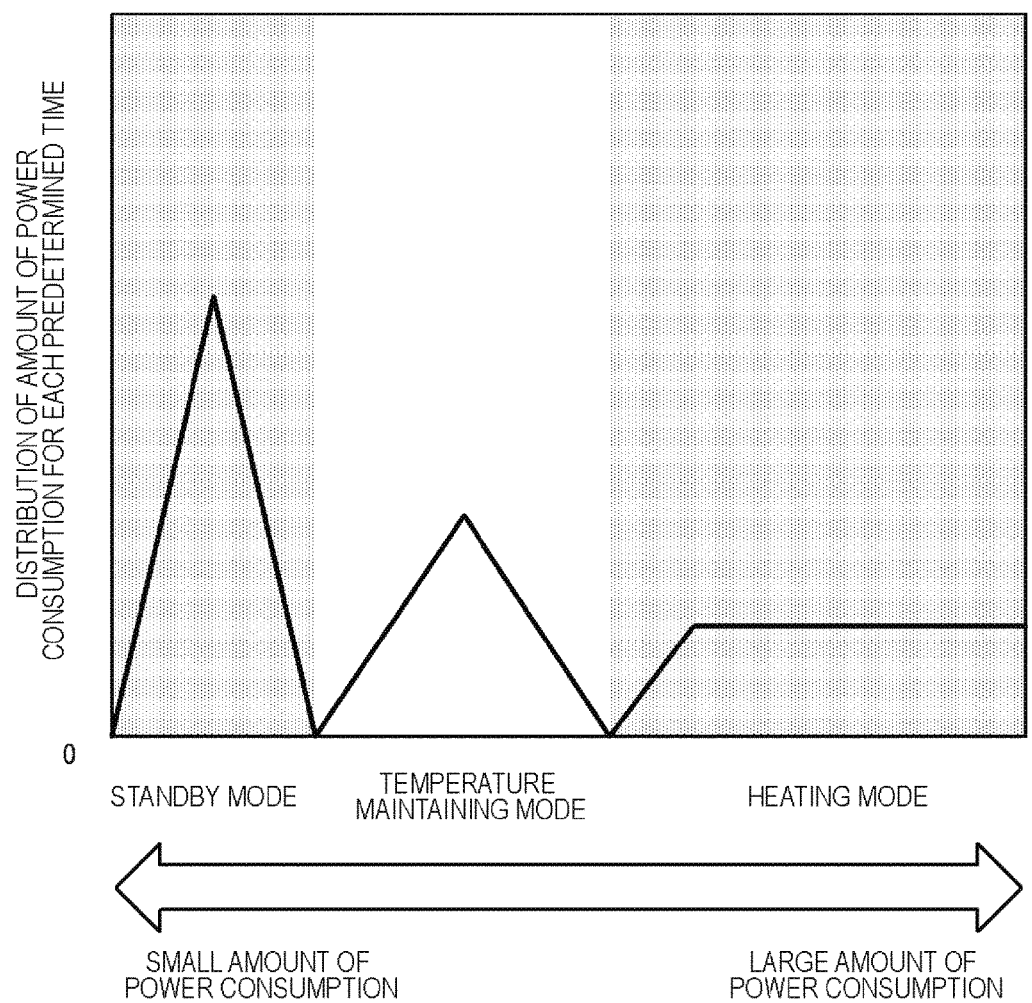
FIG. 21 is a diagram illustrating an example of a method of generating a feature amount of the present exemplary embodiment.

For example, the data collection device 50 acquires measurement data of a predetermined electric pot over a predetermined measurement period (for example, a day, a week), and then calculates a distribution of the power consumption values included in the measurement data. As a result, a distribution graph as shown in, for example, FIG. 21 is obtained. The horizontal axis of the shown graph represents a power consumption value, and the vertical axis represents a frequency of occurrence of each power consumption value. Meanwhile, a predetermined measurement period (for example, a day, a week) is divided into predetermined sub time units (for example, 10 seconds, 30 seconds, 1 minute, 15 minutes, 30 minutes), and the power consumption value (representative value) of each sub time unit is calculated, thereby allowing the frequency of each power consumption value to be calculated. The power consumption value (representative value) of each sub time unit may be set to any statistical value (for example, average value, most frequent value, intermediate value, maximum value, minimum value) of a plurality of power consumption values observed within each sub time unit, and may be set to the power consumption value of any time position (for example, beginning, middle, end) within each sub time.

When such a distribution graph is calculated, peaks appear in the power consumption value during the standby state and the power consumption value during the temperature maintaining state. Meanwhile, since the power consumption value during the heating mode changes depending on the type, amount, temperature or the like of the content filled inside, a peak does not appear in a specific power consumption value, and a smooth distribution is formed. Consequently, the data collection device 50 divides the power consumption value zone (from 0 W to a maximum power consumption value) consumed by the electric pot into three parts based on such characteristics and the obtained distribution.

For example, the data collection device 50 may set a first power consumption value zone starting from 0 W, including a first peak, to any position (terminal position) between the first peak and a second peak. The terminal position of the first power consumption value zone may be, for example, any position having a frequency of a minimum value, an intermediate position between the first peak and the second peak, or the like. The data collection device 50 may set a second power consumption value zone starting from the terminal position of the first power consumption value zone, including the second peak, to any position (terminal position) after the second peak. The terminal position of the second power consumption value zone may be, for example, any position having a frequency of a minimum value, a position from a second peak from the terminal position of the first power consumption value zone toward the direction of increase in the amount of power consumption by a distance from the terminal position of the first power consumption value zone to the second peak, or the like. The data collection device 50 may set a third power consumption value zone starting from the terminal position of the second power consumption value zone to the maximum power consumption value.

Thereafter, the data collection device 50 associates the power consumption value zones with the standby state, the temperature maintaining state, and the heating state in order from the power consumption value zone having the smallest value. That is, in a case of the above example, the data collection device 50 associates the standby state with the first power consumption value zone, the temperature maintaining state with the second power consumption value zone, and the heating state with the third power consumption value zone. In a case of this example, each power consumption value zone serves as the feature amount (training data) in each operating state.

In another example of generating the feature amount (training data), during operation of each electrical device 40 in each operating state by a user's operation, measurement data including any of the consumption current, input voltage and power consumption of the electrical device 40 may be measured, and the measurement data may be input to the data collection device 50 in association with each operating state of each electrical device 40. The data collection device 50 may calculate the feature amounts as illustrated above from the measurement data to generate the feature amount (training data) of each electrical device 40 in each operating state.

A method of causing the operating-state-change information generation unit 52 to specify the operating state of each electrical device 40 using such feature amounts (training data) and measurement data can be achieved based on the related technique. For example, in a case where the measurement data is individual measurement data, time-series individual measurement data is divided into an arbitrary number of groups in a time-series order, and the feature amount is calculated for each group. The calculated feature amount of each of a plurality of groups and the feature amount (training data) of each operating state are collated with each other, and the operating state corresponding to each of a plurality of time-series groups is specified, thereby allowing time-series data of the operating state to be generated. On the other hand, in a case where the measurement data is mixed measurement data, for example, time-series mixed measurement data is divided into an arbitrary number of groups in a time-series order, and the feature amount is calculated for each group. The calculated feature amount of each of the plurality of groups and the integrated feature amount (training data) obtained by adding the feature amounts (training data) of each of a plurality of electrical devices 40 in each operating state together through any combination are collated with each other, and a combination of the operating states of the electrical device 40 corresponding to each of a plurality of time-series groups is specified, thereby allowing time-series data of each electrical device 40 in the operating state to be generated.

An example of a process of collating the feature amount extracted from the measurement data with the training data (feature amount and integrated feature amount) may include inputting the feature amount extracted from the measurement data into an estimation model generated using the training data (feature amount and integrated feature amount), and obtaining the training data (feature amount and integrated feature amount) matched with the feature amount extracted from the measurement data as the estimation result (collation result). For example, a multiple regression analysis, a neural network, a genetic algorithm or the like may be used for the estimation model.

The operating-state-change information acquisition unit 11 of the monitoring device 10 of the present exemplary embodiment acquires the operating-state-change information generated by the operating-state-change information generation unit 52.

Meanwhile, in the modification example of the example described with standard to FIG. 19, the data collection device 50 may not include the operating-state-change information generation unit 52, and the monitoring device 10 may include the operating-state-change information generation unit 52. In this case, the measurement data acquired by the data collection unit 51 of the data collection device 50 is input to the operating-state-change information generation unit 52 of the monitoring device 10. The operating-state-change information generation unit 52 generates the operating-state-change information, similarly to the above description. The operating-state-change information acquisition unit 11 of the monitoring device 10 acquires the operating-state-change information generated by the operating-state-change information generation unit 52.

According to the present exemplary embodiment described above, it is possible to achieve the same operational effects as those in the first to fifth exemplary embodiments. In addition, since the operating-state-change information can be generated from the measurement data by computer processing, it is possible to monitor the state and maintenance of the electrical device 40 while reducing the user's time and effort.

Hereinafter, examples of reference forms are appended.

1. A monitoring device including:
an operating-state-change information acquisition unit that acquires operating-state-change information indicating a time-series change in operating states of an electrical device, the device being capable of assuming multiple types of operating states; and
a monitoring unit that acquires standard transition pattern information indicating a transition pattern between the operating states, the transition pattern serving as a standard, and determines, by using the operating-state-change information and the standard transition pattern information, whether or not a transition between the operating states of the electrical device is within the standard.

2. The monitoring device according to 1, wherein the monitoring unit acquires information obtained by associating a first operating state with a standard post-transition operating state which is at least one of the operating states that may be assumed by the electrical device immediately after the first operating state, as the standard transition pattern information.

3. The monitoring device according to 2, wherein the monitoring unit extracts a non-standard transition from a time-series change in the operating states indicated by the operating-state-change information, the non-standard transition being a transition that is not a transition between the operating states indicated by the standard transition pattern information.

4. The monitoring device according to 3, wherein the monitoring unit determines that there is an occurrence of a defect in the electrical device when a frequency of occurrence of the non-standard transition exceeds a predetermined threshold.

5. The monitoring device according to anyone of 1 to 4, further including:
an output unit that outputs a determination result of the monitoring unit;
an input receiving unit that receives a user's input indicating the validity of the determination result; and
a correction unit that corrects a standard of the determination made by the monitoring unit, in accordance with contents of the user's input received by the input receiving unit.

6. The monitoring device according to 5 depending on 4, wherein the correction unit corrects the predetermined threshold of the frequency of occurrence in accordance with the contents of the user's input received by the input receiving unit.

7. A monitoring device including:
an operating-state-change information acquisition unit that acquires operating-state-change information indicating a time-series change in operating states of each of a plurality of electrical devices, the devices being capable of assuming multiple types of operating states; and
an operation monitoring unit that acquires standard combination pattern information indicating a combination of the operating states of the plurality of electrical devices, the combination of the operating states corresponding to a predetermined operation, and determines, using the operating-state-change information and the standard combination pattern information, whether or not the predetermined operation is executed.

8. The monitoring device according to 7, wherein the predetermined operation is maintenance of a predetermined electrical device, and
the standard combination pattern information is information obtained by combining the operating states of each of the plurality of electrical devices during the time of maintenance of the predetermined electrical device.

9. The monitoring device according to 7 or 8, wherein the operation monitoring unit acquires, as the standard combination pattern information, information indicating a combination pattern obtained by combining the operating states simultaneously occurring during the predetermined operation in each of the plurality of electrical devices.

10. The monitoring device according to any one of 7 to 9, wherein the operation monitoring unit extracts a combination of the operating states indicated by the standard combination pattern information from a time-series change in the operating states indicated by the operating-state-change information, and determines that the predetermined operation is not executed in a case where the combination is not able to be extracted.

11. The monitoring device according to 10, wherein, when the combination of the operating states indicated by the standard combination pattern information is able to be extracted from a time-series change in the operating states indicated by the operating-state-change information, the operation monitoring unit determines whether or not a duration time of the combination of the operating states exceeds a predetermined threshold, and when the duration time does not exceed the predetermined threshold, the operation monitoring unit determines that the predetermined operation is not executed.

12. The monitoring device according to any one of 7 to 11, further including:
an output unit that outputs a determination result of the operation monitoring unit;
an input receiving unit that receives a user's input indicating the validity of the determination result; and a correction unit that corrects a standard of the determination made by the operation monitoring unit, in accordance with contents of the user's input received by the input receiving unit.

13. The monitoring device according to 12 depending on 11, wherein the correction unit corrects the predetermined threshold of the duration time in accordance with the contents of the user's input received by the input receiving unit.

14. A monitoring system including:
the monitoring device according to any one of 1 to 13; and
a data collection device including a data collection unit that acquires measurement data including at least one of a consumption current, an input voltage and power consumption of the electrical device,
wherein the monitoring device or the data collection device further includes an operating-state-change information generation unit that acquires the measurement data from the data collection unit, and generates the operating-state-change information using the measurement data, and
the operating-state-change information acquisition unit of the monitoring device acquires the operating-state-change information generated by the operating-state-change information generation unit.

15. A program causing a computer to function as:
an operating-state-change information acquisition unit that acquires operating-state-change information indicating a time-series change in operating states of an electrical device, the device being capable of assuming multiple types of operating states; and
a monitoring unit that acquires standard transition pattern information indicating a transition pattern between the operating states serving as a standard, and determines whether or not a transition between the operating states of the electrical device is within the standard, using the operating-state-change information and the standard transition pattern information.

15-2. The program according to 15, causing the monitoring unit to acquire information obtained by associating a first operating state with a standard post-transition operating state which is at least one of the operating states that may be assumed immediately after the first operating state, as the standard transition pattern information.

15-3. The program according to 15-2, causing the monitoring unit to extract a non-standard transition from a time-series change in the operating states indicated by the operating-state-change information, the non-standard transition being a transition that is not a transition between the operating states indicated by the standard transition pattern information.

15-4. The program according to 15-3, causing the monitoring unit to determine that there is an occurrence of a defect in the electrical device when the frequency of occurrence of the non-standard transition exceeds a predetermined threshold.

15-5. The program according to any one of 15 to 15-4, causing the computer to further function as:
an output unit that outputs a determination result of the monitoring unit;
an input receiving unit that receives a user's input indicating the validity of the determination result; and
a correction unit that corrects a standard of the determination made by the monitoring unit, in accordance with contents of the user's input received by the input receiving unit.

15-6. The program according to 15-5 depending on 15-4, causing the correction unit to correct the predetermined threshold of the frequency of occurrence in accordance with the contents of the user's input received by the input receiving unit.

16. A program causing a computer to function as:
an operating-state-change information acquisition unit that acquires operating-state-change information indicating a time-series change in operating states of each of a plurality of electrical devices, the devices being capable of assuming multiple types of operating states; and
an operation monitoring unit that acquires standard combination pattern information indicating a combination of the operating states of the plurality of electrical devices, the combination of the operating states corresponding to a predetermined operation, and determines, using the operating-state-change information and the standard combination pattern information, whether or not the predetermined operation is executed.

16-2. The program according to 16, wherein the predetermined operation is maintenance of a predetermined electrical device, and
the standard combination pattern information is information obtained by combining the operating states of each of the plurality of electrical devices during the time of maintenance of the predetermined electrical device.

16-3. The program according to 16 or 16-2, causing the operation monitoring unit to acquire, as the standard combination pattern information, information indicating a combination pattern obtained by combining the operating states simultaneously occurring during the predetermined operation in each of the plurality of electrical devices.

16-4. The program according to any one of 16 to 16-3, causing the operation monitoring unit to extract a combination of the operating states indicated by the standard combination pattern information, from a time-series change in the operating states indicated by the operating-state-change information, and to determine that the predetermined operation has not been executed in a case where the combination is not able to be extracted.

16-5. The program according to 16-4, causing the operation monitoring unit to determine whether or not a duration time of the combination of the operating states exceeds a predetermined threshold in a case where the combination of the operating states indicated by the standard combination pattern information is not able to be extracted from a time-series change in the operating states indicated by the operating-state-change information, and to determine that the predetermined operation is not executed in a case where the duration time does not exceed the predetermined threshold.

16-6. The program according to any one of 16 to 16-5, causing the computer to further function as:
an output unit that outputs a determination result of the operation monitoring unit;
an input receiving unit that receives a user's input indicating the validity of the determination result; and
a correction unit that corrects a standard of the determination made by the operation monitoring unit, in accordance with contents of the user's input received by the input receiving unit.

16-7. The program according to 16-6 depending on 16-5, causing the correction unit to correct the predetermined threshold of the duration time in accordance with the contents of the user's input received by the input receiving unit.

17. A monitoring method including causing a computer to execute:
an operating-state-change information acquisition step of acquiring operating-state-change information indicating a time-series change in operating states of an electrical device, the device being capable of assuming multiple types of operating states; and a monitoring step of acquiring standard transition pattern information indicating a transition pattern between the operating states serving as a standard, and determining whether or not a transition between the operating states of the electrical device is within the standard, using the operating-state-change information and the standard transition pattern information.

17-2. The monitoring method according to 17, wherein the monitoring step includes acquiring information obtained by associating a first operating state with a standard post-transition operating state which is at least one of the operating states that may be assumed immediately after the first operating state, as the standard transition pattern information.

17-3. The monitoring method according to 17-2, wherein the monitoring step includes extracting a non-standard transition from a time-series change in the operating states indicated by the operating-state-change information, the non-standard transition being a transition that is not a transition between the operating states indicated by the standard transition pattern information.

17-4. The monitoring method according to 17-3, wherein the monitoring step includes determining that there is an occurrence of a defect in the electrical device when a frequency of occurrence of the non-standard transition exceeds a predetermined threshold, the monitoring unit.

17-5. The monitoring method according to any one of 17 to 17-4, further including causing the computer to further execute:

an output step of outputting a determination result obtained in the monitoring step;

an input receiving step of receiving a user's input indicating the validity of the determination result; and a correction step of correcting a standard of the determination made in the monitoring step in accordance with contents of the user's input received in the input receiving step.

17-6. The monitoring method according to 17-5 depending on 17-4, wherein the correction step includes correcting the predetermined threshold of the frequency of occurrence in accordance with the contents of the user's input received in the input receiving step.

18. A monitoring method including causing a computer to execute:

an operating-state-change information acquisition step of acquiring operating-state-change information indicating a time-series change in operating states of each of a plurality of electrical devices, the devices being capable of assuming multiple types of operating states; and an operation monitoring step of acquiring standard combination pattern information indicating a combination of the operating states of the plurality of electrical devices, the combination of the operating states corresponding to a predetermined operation, and determining, using the operating-state-change information and the standard combination pattern information, whether or not the predetermined operation is executed.

18-2. The monitoring method according to 18, wherein the predetermined operation is maintenance of a predetermined electrical device, and the standard combination pattern information is information obtained by combining the operating states of each of the plurality of electrical devices during the time of maintenance of the predetermined electrical device.

18-3. The monitoring method according to 18 or 18-2, wherein the operation monitoring step includes acquiring, as the standard combination pattern information, information indicating a combination pattern obtained by combining the operating states simultaneously occurring during the predetermined operation in each of a plurality of the electrical devices.

18-4. The monitoring method according to any one of 18 to 18-3, wherein the operation monitoring step includes extracting a combination of the operating states indicated by the standard combination pattern information, from a time-series change in the operating states indicated by the operating-state-change information, and determining that the predetermined operation is not executed in a case where the combination is not able to be extracted.

18-5. The monitoring method according to 18-4, wherein the operation monitoring step includes determining whether or not a duration time of the combination of the operating states exceeds a predetermined threshold in a case where the combination of the operating states indicated by the standard combination pattern information is not able to be extracted from a time-series change in the operating states indicated by the operating-state-change information, and determining that the predetermined operation is not executed in a case where the duration time does not exceed the predetermined threshold.

18-6. The monitoring method according to any one of 18 to 18-5, further including causing the computer to execute:

an output step of outputting a determination result obtained in the operation monitoring step;

an input receiving step of receiving a user's input indicating the validity of the determination result; and a correction step of correcting a standard of the determination made in the operation monitoring step in accordance with contents of the user's input received in the input receiving step.

18-7. The monitoring method according to 18-6 depending on 18-5, wherein the correction step includes correcting the predetermined threshold of the duration time in accordance with the contents of the user's input received in the input receiving step.

This application claims priority from Japanese Patent Application No. 2014-059753 filed on Mar. 24, 2014, the content of which is incorporated herein by reference in its entirety.

The invention claimed is:

1. A monitoring device comprising:

an operating-state-change information acquisition unit, implemented by a processor, that acquires operating-state-change information indicating a time-series change in operating states of each of a plurality of electrical devices, the devices being capable of assuming multiple types of operating states; and an operation monitoring unit, implemented by the processor, that acquires standard combination pattern information indicating a combination of the operating states of the plurality of electrical devices, the combination of the operating states corresponding to a predetermined operation, and determines, using the operating-state-change information and the standard combination pattern information, whether or not the predetermined operation is executed, wherein the predetermined operation is maintaining a normal operating state of a predetermined electrical device, and the standard combination pattern information is information obtained by combining the operating states of each of the plurality of electrical devices during the time of maintaining the operating state of the predetermined electrical device.

2. The monitoring device according to claim 1, wherein the operation monitoring unit acquires, as the standard combination pattern information, information indicating a combination pattern obtained by combining the operating states simultaneously occurring during the predetermined operation in each of the plurality of electrical devices.

3. The monitoring device according to claim 1, wherein the operation monitoring unit extracts, from a time-series change in the operating states indicated by the operating-state-change information, a combination of the operating states indicated by the standard combination pattern information, and determines that the predetermined operation is not executed when the combination is not able to be extracted.

4. The monitoring device according to claim 3, wherein, when the combination of the operating states indicated by the standard combination pattern information is able to be extracted from the time-series change in the operating states indicated by the operating-state-change information, the operation monitoring unit determines whether or not a duration time of the combination of the operating states exceeds a predetermined threshold, and determines that the predetermined operation is not executed when the duration time does not exceed the predetermined threshold.

5. The monitoring device according to claim 4, further comprising:
an output unit, implemented by the processor, that outputs a determination result of the operation monitoring unit;
an input receiving unit, implemented by the processor, that receives a user's input indicating the validity of the determination result; and
a correction unit, implemented by the processor, that corrects a standard of the determination made by the operation monitoring unit, in accordance with contents of the user's input received by the input receiving unit,
wherein the correction unit corrects the predetermined threshold of the duration time in accordance with the contents of the user's input received by the input receiving unit.

6. The monitoring device according to claim 1, further comprising:
an output unit, implemented by the processor, that outputs a determination result of the operation monitoring unit;
an input receiving unit, implemented by the processor, that receives a user's input indicating the validity of the determination result; and
a correction unit, implemented by the processor, that corrects a standard of the determination made by the operation monitoring unit, in accordance with contents of the user's input received by the input receiving unit.

7. A non-transitory storage medium storing a program, when executed, causing a computer to perform a monitoring method, the monitoring method comprising:
acquiring operating-state-change information indicating a time-series change in operating states of each of a plurality of electrical devices, the devices being capable of assuming multiple types of operating states; and
acquiring standard combination pattern information indicating a combination of the operating states of the plurality of electrical devices, the combination of the operating states corresponding to a predetermined operation, and determining, using the operating-state-change information and the standard combination pattern information, whether or not the predetermined operation is executed, wherein:
the predetermined operation is maintaining a normal operating state of a predetermined electrical device, and
the standard combination pattern information is information obtained by combining the operating states of each of the plurality of electrical devices during the time of maintaining the operating state of the predetermined electrical device.

8. A monitoring method, comprising:
acquiring operating-state-change information indicating a time-series change in operating states of each of a plurality of electrical devices, the devices being capable of assuming multiple types of operating states; and
acquiring standard combination pattern information indicating a combination of the operating states of the plurality of electrical devices, the combination of the operating states corresponding to a predetermined operation, and determining, using the operating-state-change information and the standard combination pattern information, whether or not the predetermined operation is executed, wherein:
the predetermined operation is maintaining a normal operating state of a predetermined electrical device, and
the standard combination pattern information is information obtained by combining the operating states of each of the plurality of electrical devices during the time of maintaining the operating state of the predetermined electrical device.

* * * * *